(12) United States Patent
Walker

(10) Patent No.: US 9,539,674 B2
(45) Date of Patent: Jan. 10, 2017

(54) CLOG RESISTANT VALVE PORT AND METHODS RELATING TO SAME

(71) Applicant: Rain Bird Corporation, Azusa, CA (US)

(72) Inventor: Samuel C. Walker, Green Valley, AZ (US)

(73) Assignee: Rain Bird Corporation, Azusa, CA (US)

( * ) Notice: Subject to any disclaimer, the term of this patent is extended or adjusted under 35 U.S.C. 154(b) by 62 days.

(21) Appl. No.: 14/087,992

(22) Filed: Nov. 22, 2013

(65) Prior Publication Data
US 2015/0144815 A1 May 28, 2015

(51) Int. Cl.
*B23P 15/00* (2006.01)
*F16K 31/40* (2006.01)

(52) U.S. Cl.
CPC ............ *B23P 15/001* (2013.01); *F16K 31/402* (2013.01); *Y10T 29/49412* (2015.01); *Y10T 29/49417* (2015.01)

(58) Field of Classification Search
CPC ....... F16K 51/00; F16K 31/401; B23P 15/001; Y10T 29/49412; Y10T 29/49417
USPC  251/30.01, 30.02, 148, 151, 331; 137/15.09
See application file for complete search history.

(56) References Cited

U.S. PATENT DOCUMENTS

| | | |
|---|---|---|
| 954,313 A | 4/1910 | Lillyman |
| 3,239,148 A | 3/1966 | Entyre |
| 3,336,843 A | 8/1967 | Griswold |
| 3,346,004 A | 10/1967 | Costello |
| 3,357,567 A | 12/1967 | Wake |
| 3,517,714 A | 6/1970 | Desbarats |
| 3,550,775 A | 12/1970 | Cooley |
| 3,578,284 A | 5/1971 | Martini |
| 3,599,866 A | 8/1971 | Bolton |
| 3,623,607 A | 11/1971 | Loos |
| 3,653,348 A | 4/1972 | Baumhaft |
| 3,662,953 A | 5/1972 | Wiens |
| 3,754,651 A | 8/1973 | Lannoch |
| 3,782,634 A | 1/1974 | Herman |
| 3,850,802 A | 11/1974 | Berger |
| 3,959,140 A | 5/1976 | Legras |
| 4,003,837 A | 1/1977 | Osborne |
| 4,019,984 A | 4/1977 | Mohn |
| 4,039,452 A | 8/1977 | Fernandez |
| 4,045,345 A | 8/1977 | Drori |
| 4,060,483 A | 11/1977 | Barzuza |
| 4,081,171 A | 3/1978 | Morgan |

(Continued)

FOREIGN PATENT DOCUMENTS

| | | |
|---|---|---|
| EP | 1245258 | 10/2002 |
| JP | 2000256493 | 9/2000 |

*Primary Examiner* — Kevin Murphy
*Assistant Examiner* — Daphne M Barry
(74) *Attorney, Agent, or Firm* — Fitch, Even, Tabin & Flannery, LLP

(57) ABSTRACT

An irrigation valve has a valve body with an inlet passage, an outlet passage, a valve seat intermediate the inlet passage and the outlet passage and a control chamber exit or bypass passage terminating in a surface that defines a portion of the outlet passage, the valve body including at least one of a recess and a rib for hindering clogging of the bypass passage. Related methods for hindering clogging of the control chamber or exit bypass passage are also disclosed.

13 Claims, 14 Drawing Sheets

(56) References Cited

U.S. PATENT DOCUMENTS

| | | |
|---|---|---|
| 4,135,696 A | 1/1979 | Saarem |
| 4,180,236 A | 12/1979 | Saarem |
| 4,217,116 A | 8/1980 | Seever |
| 4,235,414 A | 11/1980 | Lis |
| 4,271,018 A | 6/1981 | Drori |
| 4,278,540 A | 7/1981 | Drori |
| 4,337,158 A | 6/1982 | Bodine |
| 4,360,037 A | 11/1982 | Kendall |
| 4,505,450 A | 3/1985 | Saarem |
| 4,530,463 A | 7/1985 | Hiniker |
| 4,655,910 A | 4/1987 | Tabor |
| 4,655,911 A | 4/1987 | Tabor |
| 4,671,485 A | 6/1987 | Saarem |
| 4,736,889 A | 4/1988 | Stephenson |
| 4,818,402 A | 4/1989 | Steiner |
| 4,911,401 A | 3/1990 | Holcomb |
| 4,919,801 A | 4/1990 | Hobson, Jr. |
| 4,981,261 A | 1/1991 | Bergmann |
| 5,028,017 A | 7/1991 | Simmons |
| 5,074,999 A | 12/1991 | Drori |
| 5,134,961 A | 8/1992 | Giles |
| 5,144,699 A | 9/1992 | Graham |
| 5,192,429 A | 3/1993 | Bader |
| 5,213,303 A | 5/1993 | Walker |
| 5,228,993 A | 7/1993 | Drori |
| 5,312,544 A | 5/1994 | Kinney |
| 5,389,243 A | 2/1995 | Kaplan |
| 5,401,396 A | 3/1995 | Lescovich |
| 5,431,181 A | 7/1995 | Saadi |
| 5,433,380 A | 7/1995 | Hahn |
| 5,560,820 A | 10/1996 | Consolo |
| 5,584,314 A | 12/1996 | Bron |
| 5,670,038 A | 9/1997 | McKinney |
| 5,704,546 A | 1/1998 | Henderson |
| 5,804,072 A | 9/1998 | Yang |
| 5,830,347 A | 11/1998 | Vollmer |
| 5,911,362 A | 6/1999 | Wood |
| 5,979,304 A | 11/1999 | Norais |
| 5,996,608 A | 12/1999 | Hunter |
| 6,110,388 A | 8/2000 | Norais |
| 6,186,413 B1 | 2/2001 | Lawson |
| 6,394,413 B2 | 5/2002 | Lohde |
| 6,575,307 B2 | 6/2003 | Lockwood |
| 7,007,916 B2 | 3/2006 | Lee |
| 7,501,058 B1 | 3/2009 | Lawrence, Sr. |
| 7,506,899 B2 * | 3/2009 | Feith .............................. 285/322 |
| 8,505,566 B2 | 8/2013 | Nguyen |
| 8,740,177 B2 * | 6/2014 | Walker ........................ 251/30.02 |
| 2009/0095935 A1* | 4/2009 | Wlodarczyk .................. 251/331 |
| 2009/0101855 A1* | 4/2009 | Nguyen ........................ 251/120 |

\* cited by examiner

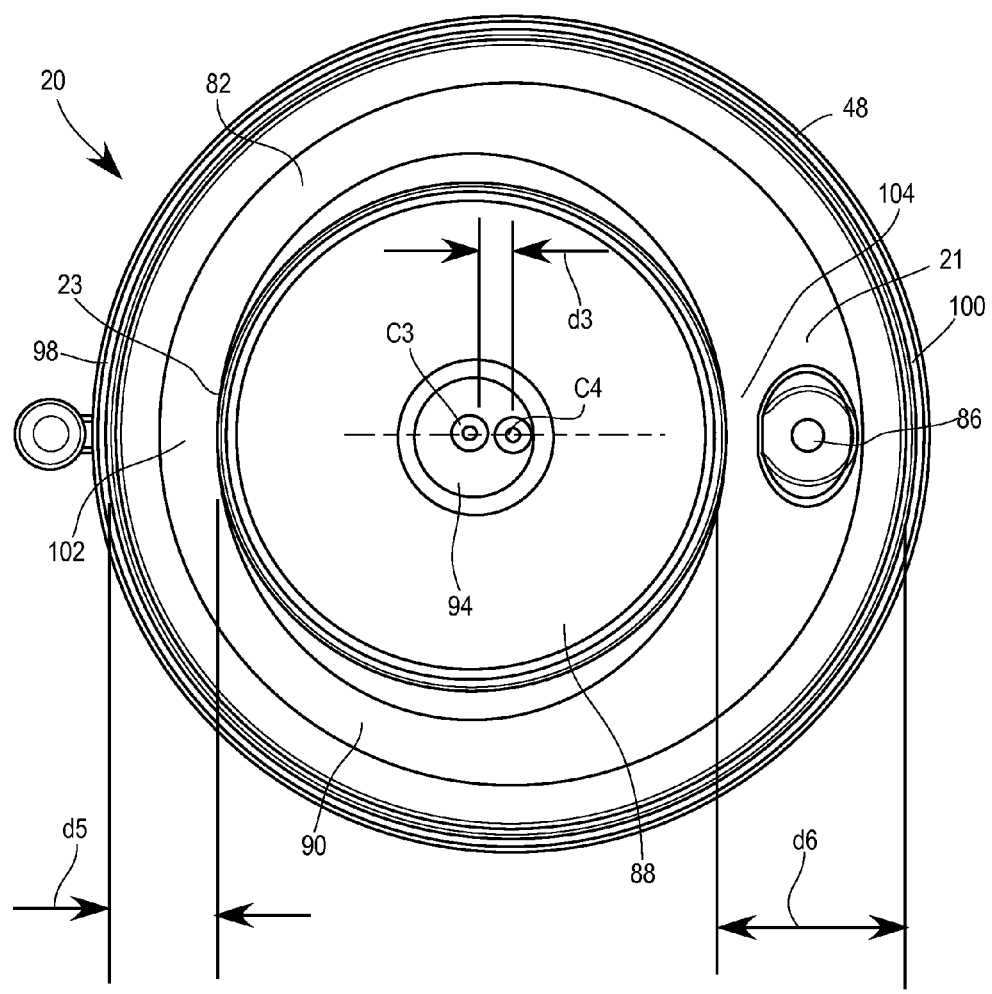

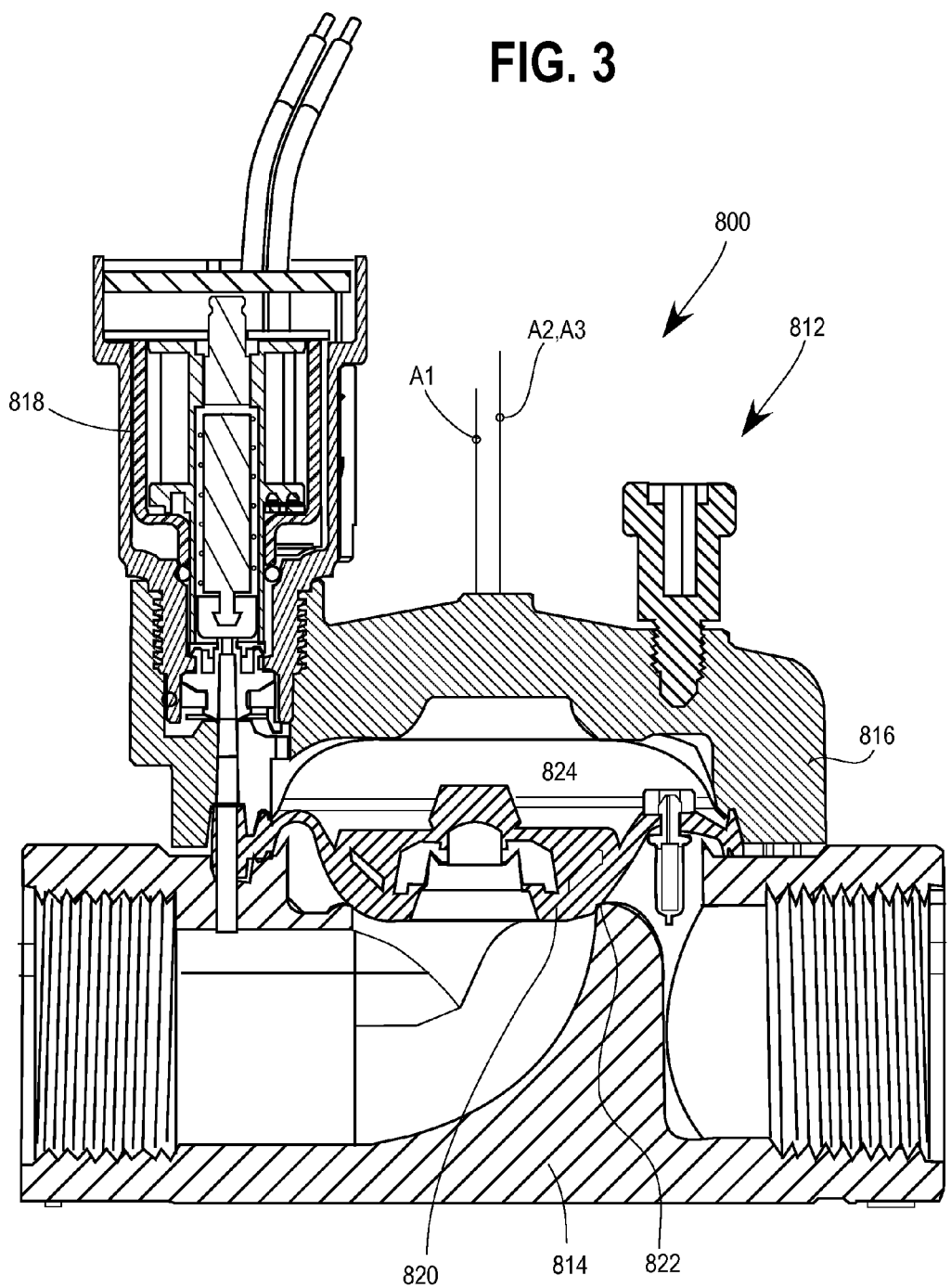

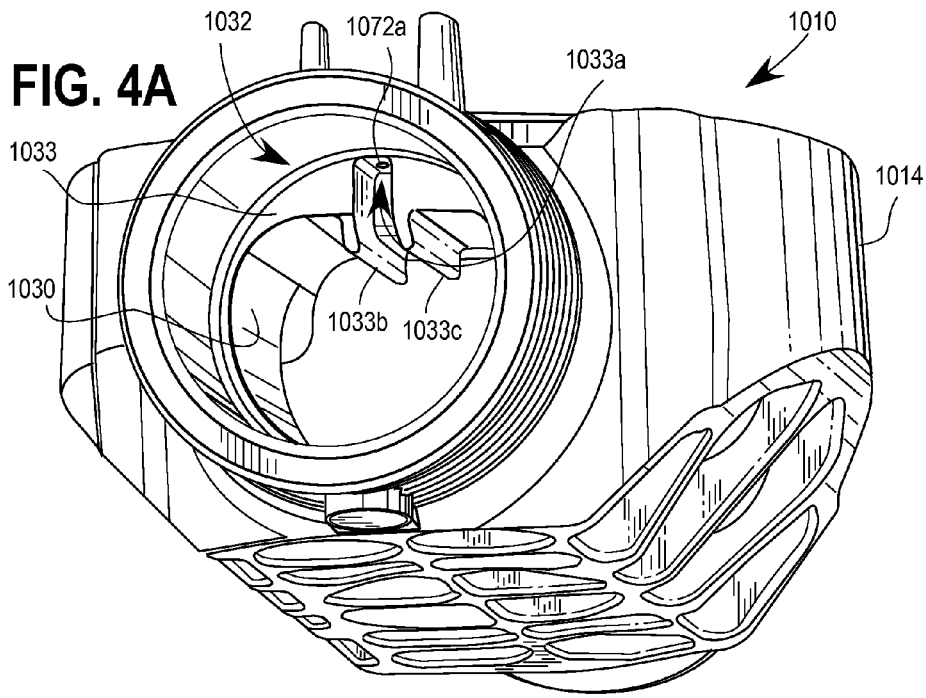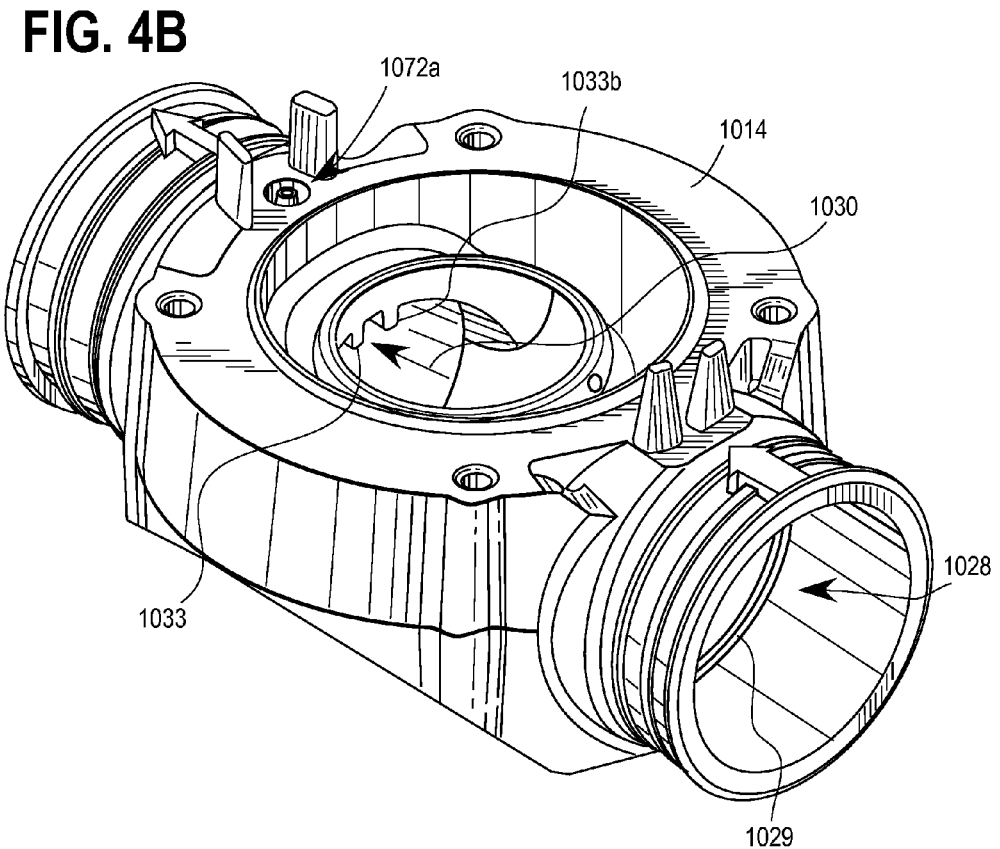

CLOG RESISTANT VALVE PORT AND METHODS RELATING TO SAME

FIELD

This disclosure is directed to a diaphragm valve for irrigation systems and, in particular, to a diaphragm valve configured for improved flow and reduced wear and to a clog resistant port for such valves and methods relating to same.

BACKGROUND

Diaphragm valves for use in irrigation systems commonly have an inlet passage, an outlet passage, and a diaphragm positioned to selectively open and close a generally cylindrical diaphragm seat to permit or block fluid flow from the inlet passage to the outlet passage. A control chamber is positioned on the opposite side of the diaphragm from the seat to control the position of the diaphragm relative to the seat.

When the fluid pressure acting on the diaphragm from the control chamber side exceeds the fluid pressure acting on the opposite side of the diaphragm, the diaphragm will be forced against the seat to block fluid flow through the seat and thereby block fluid flow from the inlet passage to the outlet passage.

Conversely, when the fluid pressure acting on the diaphragm from the control chamber side is less than the fluid pressure acting on the opposite side of the diaphragm, the diaphragm will be forced away from the seat to permit fluid flow through the seat and thereby permit fluid flow from the inlet passage opening to the outlet passage.

As the diaphragm moves from the open position to the closed position, the distance, and in turn the flow area, between the seat and the diaphragm continually decreases until the diaphragm engages the seat to block flow through the seat. The bottom surface of the diaphragm commonly has an annular portion designed to engage an annular seat. In the closing operation, the diaphragm typically lowers straight onto the seat so that the entire annular portion engages the seat relatively simultaneously. The final portion of the closing movement causes an abrupt change in the flow area between the diaphragm and the seat and, consequently a sudden pressure spike greater than the upstream pressure. More specifically, the abrupt conversion of the motion energy in the flowing fluid to pressure energy acting on the components of the diaphragm valve can cause a pressure spike in the upstream pressure. Pressure spikes are known to cause the diaphragm valve to experience a water hammer effect, which can undesirably result in increased stress on the components of the diaphragm valve, as well as other components of the irrigation system. Overall, this can lead to premature wear or failure of the components.

In order to control the pressure in the control chamber, the valve typically has a fluid entrance path to, and a fluid exit path from, the control chamber. The fluid entrance path may extend between the inlet passage and the control chamber and may be continuously supplied with fluid from the inlet passage. The fluid exit path may extend between the control chamber and the outlet passage. A selectively actuable control valve or actuator may be positioned to block and permit fluid flow through the fluid exit path.

When the control valve is positioned to block fluid flow through the fluid exit path from the control chamber, the fluid entrance path continues to permit fluid to flow from the inlet passage to the control chamber, thereby causing fluid to accumulate in the control chamber. The diaphragm has a larger surface area exposed to pressure on the control chamber side than is exposed to high pressure on the side facing the inlet passage. Thus, when the fluid pressure in the control chamber and inlet passage are generally the same, the operation of the fluid pressure in the control chamber acts on the greater surface area of the control chamber side of the diaphragm and causes the diaphragm to either shift from the open position to the closed position or remain in the closed position.

When the control valve is positioned to permit fluid flow through the fluid exit path from the control chamber, fluid exits the control chamber at a faster rate than fluid enters the control chamber. This causes the fluid pressure acting on the control chamber side of the diaphragm to decrease relative to the fluid pressure acting on the side of the diaphragm facing the inlet passage. The fluid pressure in the inlet passage then causes the diaphragm to move to the open position, whereby the diaphragm is spaced from the seat and fluid flow is permitted from the inlet passage, through the seat and out the outlet passage.

The flow path that the fluid follows when the diaphragm valve is in the open position is generally from the inlet passage, through the diaphragm seat, and finally out through the outlet passage. As the fluid follows this path, internal geometry of the diaphragm valve and valve housing can cause very rapid acceleration and deceleration of the fluid. Specifically, in reverse flow, upright diaphragm valves, a cylindrical wall forms an annular diaphragm seat and a passage from the inlet leads to an annular cavity between the cylindrical wall and the outer wall of the valve. The entrance to the annular cavity typically has a reduced flow area between the end of a wide inlet passage and the cylindrical wall which can cause acceleration of the fluid upon entering a smaller area from the larger inlet passage. Simultaneously, this intersection forces some of the incoming flow to turn upward to the valve seat and directs some of the incoming flow to the lateral sides and to the downstream side of the annular cavity before flowing upward to the seat. Such geometry of upright valves and internal flow path therein can lead to rapid turning of the fluid flow, thereby accelerating the flow, in a vector sense (or in other words negative acceleration or deceleration), by forcing it to change direction several times.

This undesirable acceleration and deceleration may be compounded during the transition periods between the open and closed positions depending on the way the diaphragm shifts relative to the seat. Particularly, for diaphragms that lift straight off of the seat, or in other words generally vertical, the seat draws a significant amount of water from the outlet side of the seat thereby maintaining a relatively high acceleration of the flow at least during the transition between the open and closed positions of the valve.

Further, while these known diaphragms are designed to lift straight upward, the varying forces and pressures on the diaphragm can cause the diaphragm to slightly tilt as it lifts upward affecting pressure loss in undesirable ways. In one case, since the downstream side of the annular cavity creates a dead end where the fluid is redirected back toward the valve seat, this structure causes stagnation and relatively high fluid pressure at the downstream side of the annular cavity. The high pressure may result in the diaphragm lifting with an undesirable tilt where the downstream side of the diaphragm lifts higher than the upstream side. Such tilting in undesirable directions can cause turbulence and pressure loss.

In addition, the geometry of the diaphragm seat itself can cause additional acceleration of the fluid as it approaches the opening of the seat from the entrance area of the inlet cavity. This can be due to the larger flow area of the inlet opening or the inlet cavity as compared to the flow area of the opening of the seat, which can cause the fluid to rapidly accelerate as it approaches the opening in order to maintain conservation of mass in the incompressible flow. Moreover, the geometry of the seat can cause deceleration of the fluid at it exits the opening of the seat and enters the outlet opening due to the smaller flow area of the opening of the seat as compared to the larger flow area of the adjacent portion of the outlet opening.

Such varying flow, with rapid acceleration and/or deceleration of the flow, whether through a change in flow area or flow direction, can cause the loss of energy in the fluid, which results in a pressure loss in the diaphragm valve and can therefore increase the number of valves required to irrigate the intended area.

Another problem associated with conventional valves relates to the manner in which they are connected into a fluid carrying system. More particularly, valves provided with slip inlets and/or slip outlets are typically connected to piping, such as polyvinyl chloride (PVC) piping, via an adhesive (e.g., PVC cement or glue). The adhesive is either applied around the end of the PVC pipe to be inserted into the valve inlet/outlet or applied directly to the valve inlet/outlet, (or sometimes both). The application of the adhesive can easily become messy at times which can be very problematic with respect to the valve outlet due to the presence of the solenoid valve bypass passage outlet being positioned at or near the valve outlet (also referred to as the body dump hole). Often times the adhesive may inadvertently clog the bypass passage outlet or body dump hole which can negatively impact the performance of the diaphragm valve. This negative impact may range from taking the valve longer to open and close than desired in some instances (e.g., when the dump hole is only partially clogged), all the way to completely preventing the valve from operating in other instances due to an inability to drain fluid from the control chamber of the valve via the solenoid valve bypass passage (e.g., when the dump hole is completely clogged). Although not necessary, some installers may use adhesive with other valve configurations besides the slip by slip (or s×s) configuration. Thus, dump hole clogging can be an issue with respect to multiple types of valves.

In view of the foregoing, there remains a need for diaphragm valves having improved flow, including the reduction of energy lost during flow, and for valves that account for installation practices and resist clogging in view of same.

BRIEF DESCRIPTION OF THE DRAWINGS

FIG. 1E is a top plan view of a diaphragm of the diaphragm valve of FIG. 1;

FIG. 3 is a side cross-sectional view of an alternative diaphragm valve for irrigation systems;

FIGS. 4A and 4B are rear and front perspective views, respectively, of a valve body having a rib and slot configuration in accordance with the invention with FIG. 4A illustrating the outlet end of the valve body viewed slightly from below and FIG. 4B illustrating the inlet end of the valve body viewed from above;

DESCRIPTION OF PREFERRED EMBODIMENTS

Figure 1A:
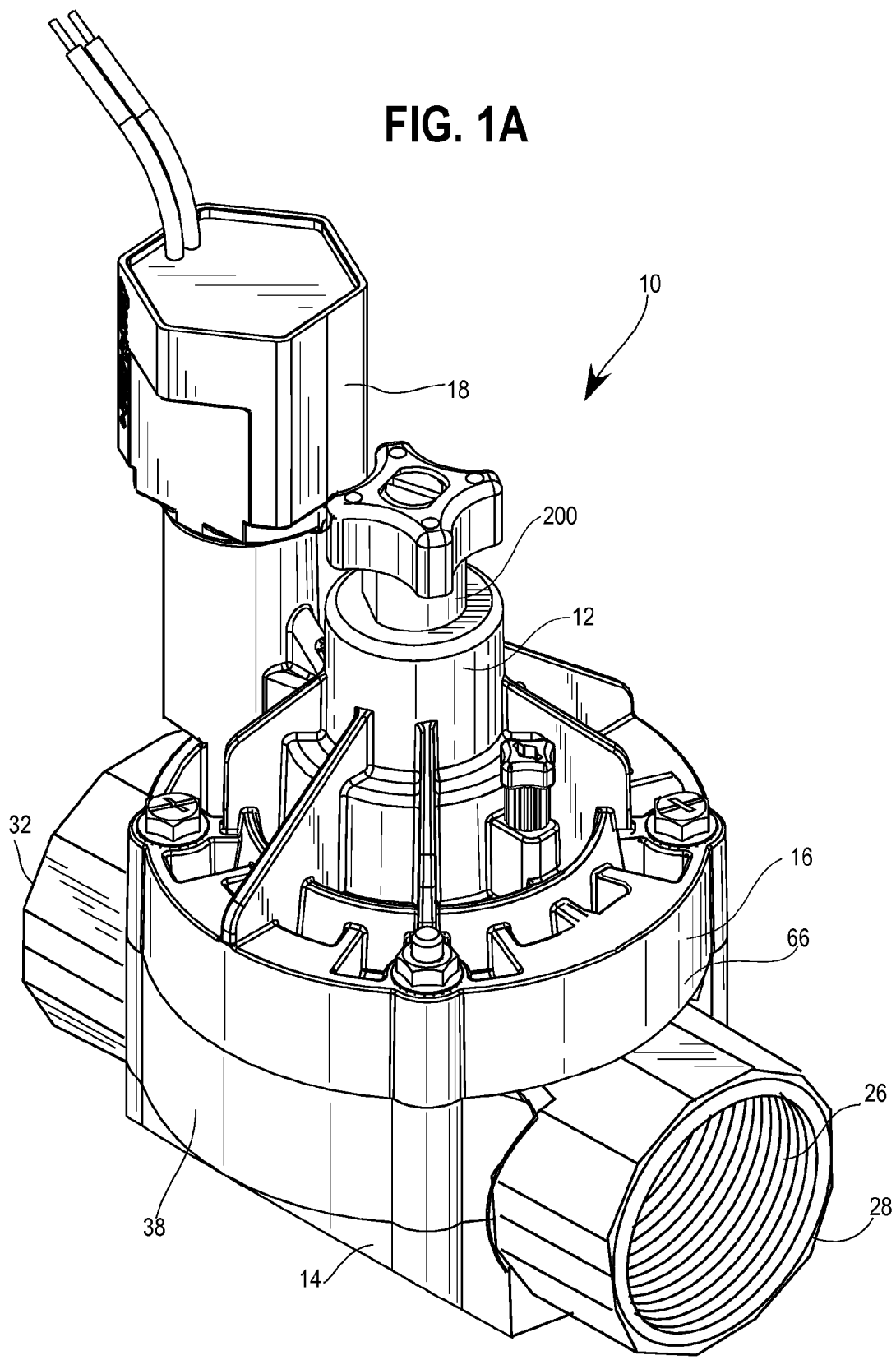
FIG. 1A is a perspective view of a diaphragm valve for irrigation systems.

Referring to FIGS. 1A-F, an eccentric diaphragm valve 10 includes a valve body 14 and a bonnet or cover 16 attached to the valve body 14. A solenoid actuator 18 is attached to the bonnet 16. The diaphragm valve 10 includes an offset or eccentric diaphragm 20 located between the valve body 14 and the bonnet 16 and that is shiftable both away from and toward a diaphragm valve seat 22 formed by the valve body 14. In the illustrated form, the valve seat 22 is placed farther away from an inlet passage 26 compared to known valves to provide more space between the two for incoming fluid flow. This larger space is referred to herein as an inlet entrance area 42. Due to its increased size, the inlet entrance area 42 reduces the change in flow area relative to the flow area of the larger inlet passage 26. This configuration also permits relatively wider turns for the fluid. These features result in a more uniform fluid flow and, therefore, less acceleration and deceleration.

In one form, placing an eccentric diaphragm 20 on such an eccentric valve seat results in the diaphragm 20 pivoting in a hinge-like manner where the inlet side 21 of the diaphragm 20 raises higher than the outlet side 23 of the diaphragm 20 to a slanted orientation (FIG. 1F), as explained below. At least during a transition period while the diaphragm 20 moves between the open and closed positions, this results in more direct flow on the inlet side 60 of the valve seat 22 than on the outlet side 58 of the valve seat, which reduces pressure loss and the fluctuation of flow velocity. The risk of water hammer also is reduced because closing the valve 10 is performed by rotating the diaphragm 20 from its slanted orientation back onto the horizontal valve seat 22 which causes the diaphragm 20 to engage the valve seat 22 in a relatively gradual or rolling manner from one side of the valve seat 22 to the other to avoid an abrupt change of pressure.

In more detail, when the diaphragm 20 is engaged with the valve seat 22, fluid flow through the diaphragm valve 10 is blocked. Conversely, when the diaphragm 20 is unengaged with the diaphragm valve seat 22, fluid flow through the diaphragm valve 10 is permitted. In conjunction with the solenoid actuator 18, an internal control chamber 24, positioned between the valve body 14 and the diaphragm 20 on one side and the bonnet 16 on the other, is used to shift the diaphragm 20 relative to the valve seat 22.

The valve body 14 defines the inlet passage 26 that terminates at an inlet opening 28 and an outlet passage 30 that terminates at an outlet opening 32. The inlet and outlet openings 28, 32 are sized and shaped (here shown to be threaded as an example) to be joined to piping of an irrigation system. In one form, the outlet passage 30 extends at least generally linearly as it extends interiorly from the outlet end 32 until the outlet passage 30 forms an upwardly turned portion 34. The upwardly turned portion 34 is formed by a generally annular or cylindrical wall 36 of the valve body 14. The annular wall 36 terminates at the valve seat 22 to form the entrance to the outlet passage 30. While the valve seat 22 may be any closed shape, in particular form the valve seat 22 is at least substantially circular. With this arrangement, the valve seat 22 extends at least substantially horizontal and around a vertical axis A1 (FIG. 1C). The valve seat 22 also defines a center point C1 at the vertical axis A1 in top view (FIG. 1D). In this form, the valve seat 22 extends substantially normal to the vertical axis A1. It will be understood, however, that the valve seat 22 is not meant to be limited to only a perfectly circular form, and the axis and center point are not necessarily limited to axes or centers of a circular shape as long as the axis and center point define some central point defined by the closed shape of the valve seat. This similarly applies to any of the axes and center points of the structures described herein.

It will also be understood that the mention of horizontal and vertical directions or axes is meant to include any rotated orientation of the valve body by any degree as long as the valve seat extends at least substantially parallel to the general direction of flow through the valve. In the illustrated form, the valve seat extends at least substantially horizontal as is the general direction of flow F (FIG. 1B) through the valve 10 from inlet end 28 to outlet end 32.

The valve body 14 also includes an at least partially annular, outer wall 38, and an at least partially annular inlet chamber or cavity 40 that extends between the annular wall 36 and the valve seat 22 on the inside and the annular wall 38 on the outside. The inlet chamber 40 extends at least partially, but in one form entirely, about the valve seat 22, and receives water flow from the inlet passage 26 at an inlet side (also referred to as the inlet entrance area) 42 of the inlet chamber 40. The annular wall 36 also forms a flaring guiding fin or projection 37 at the inlet side 42 of the inlet chamber 40 and with an edge 39 (FIGS. 1C-D) facing the inlet end 28 to more smoothly redirect the incoming fluid to the lateral sides of the annular wall 36.

The outer wall 38 forms an upper rim 44 that defines the main upper opening 46 on the valve body 14 and forms a periphery 45 of the inlet chamber 40. The upper rim 44 provides access to the valve seat 22 for the diaphragm 20 and is adapted to receive at least a portion of an outer perimeter 48 of the diaphragm 20 to secure the outer perimeter 48 between the valve body 14 and the bonnet 16. The outer perimeter 48 may have at least one circumferential bead 49 retained within grooves on the valve body 14, bonnet 16, or both. The upper rim 44 may also provide bolting locations to secure the bonnet 16 to the valve body 14. A raised lip 50 of the upper rim 44 forms the inner edge 52 of the upper rim 44 defining the main opening 46.

The upper rim 44 and the inlet chamber 40 extend around a vertical axis A2 and define a common center point C2 in top view and at the vertical axis A2. In one form, the upper rim 44 is at least substantially circular and is non-concentric to the valve seat 22. Thus, the vertical axis A1 is offset in the downstream direction from the vertical axis A2 (FIG. 1C), and the center point C1 is offset the same from the center point C2 (FIG. 1D) in order to align with the eccentric diaphragm 20 as explained below. In other words, the vertical axis A1 of the valve seat 22 is closer to the outlet end 32 than the vertical axis A2 of the inlet chamber 40 and the upper rim 44. With this configuration, an outlet side 54 of the upper rim 44 is closer to the valve seat 22 than an inlet side 56 of the upper rim. Thus, the outlet side 54 of the upper rim 44 is spaced from the outlet side 58 of the valve seat 22 by a distance d1 which is shorter than a distance d2 between the inlet side 56 of the upper rim 44 and the inlet side 60 of the valve seat 22 (best seen in FIG. 1D). More precisely, distances d1 and d2 are measured to the outer diameter of the valve seat 22 and, in one form, as provided by the cylindrical wall 36. For distance d2 at the very inlet end of valve seat 22, the distance d2 starts at the point the cylindrical wall 36 would be if it were substantially cylindrical (as shown by the dashed line) instead of forming the fin 37. This results in the inlet chamber 40 being narrower closer to the outlet end 32 than its inlet side (or inlet entrance area) 42 near the inlet end 28. This larger area for the inlet entrance area 42 contributes to a smoother and more uniform flow through the valve. The inlet chamber 40 also is shallower on the outlet side 54 to accommodate a wall 62 of the valve body 14 that defines in part the outlet passage 30. In other words, the outer side of the wall 62 also defines the bottom of the inlet chamber 40 at the outlet side 54.

The bonnet 16 has a generally dome-shaped portion 64 surrounded by a peripheral flange 66 that is secured to the upper rim 16. The dome shaped portion 64 forms the top of the control chamber 24 and a bleed port 68 to selectively release pressure and/or fluid from the control chamber 24. The dome shaped portion 64 also holds a flow-control assembly 200 described below. In one optional form, a spring 70 (FIG. 1C) may be placed within bonnet 16 and between the flow control assembly 200 if present and the diaphragm 20 to assist with biasing the diaphragm 20 toward the valve seat 22.

A bypass passage 72 is formed on the bonnet 16 for directing the fluid from the control chamber 24 to the outlet passage 30. To control the flow through the bypass passage 72, the solenoid actuator 18 is mounted on the bonnet 16 and provides a solenoid valve seat 74 that forms part of the bypass passage and which is opened and closed by a plunger 76. The plunger 76 moves axially to engage and disengage the solenoid valve seat 74. More specifically, a spring 75 biases the plunger 76 to engage the valve seat 74 to block flow from the control chamber 24 to the outlet passage 30. When the solenoid actuator 18 is energized, a coil produces a magnetic flux that retracts the plunger 76 away from the solenoid valve seat 74 to open the bypass passage 72 and allow fluid from the control chamber 24 to the outlet passage 30. When electrical current to the solenoid activator 18 is turned off, the spring 75 biases the plunger 76 to engage the solenoid valve seat 74 and close the bypass passage 72 to cause fluid pressure to build in the control chamber 24.

Figure 1B:
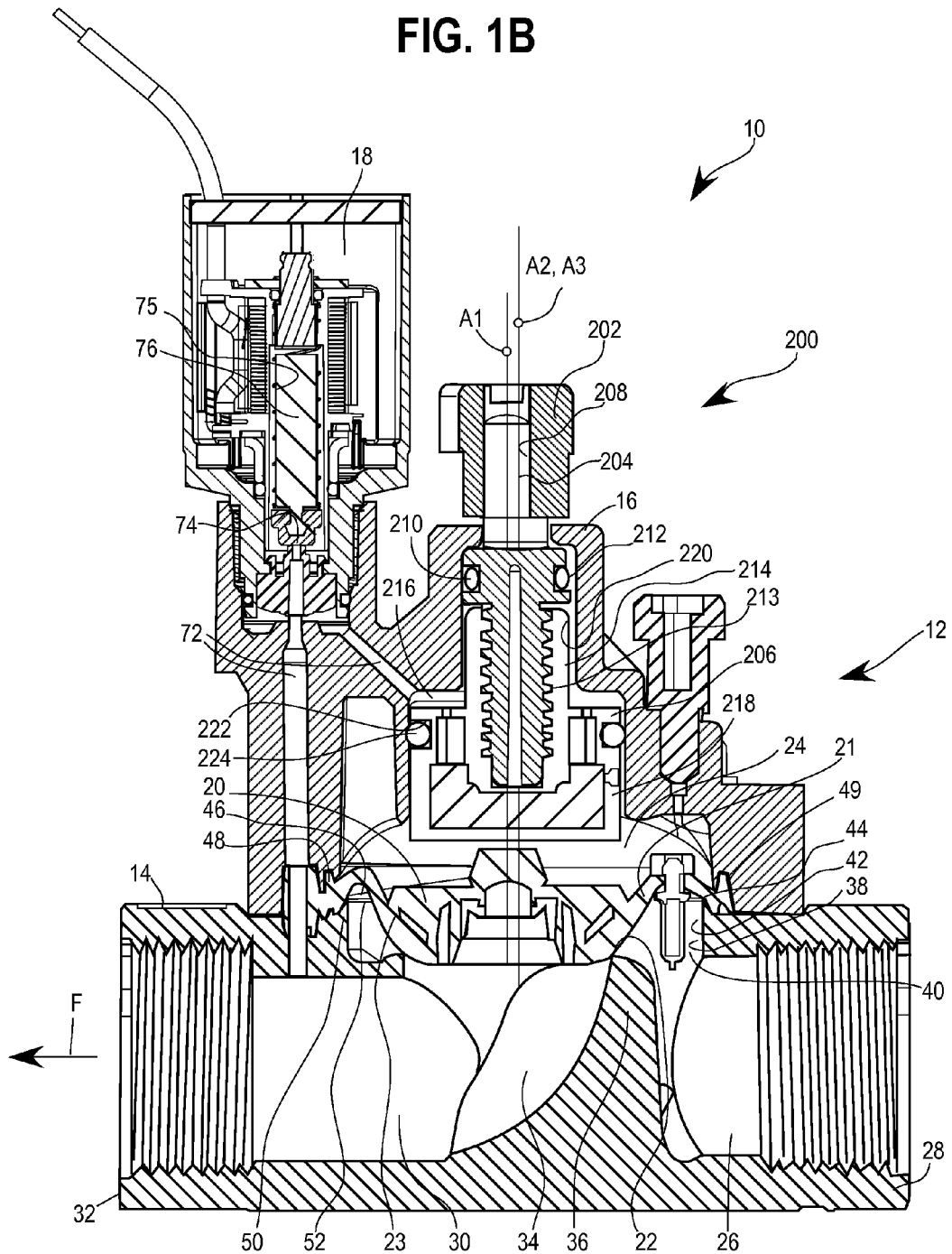
FIG. 1B is a side cross-sectional view of the diaphragm valve of FIG. 1 shown in a closed state.
Figure 1C:
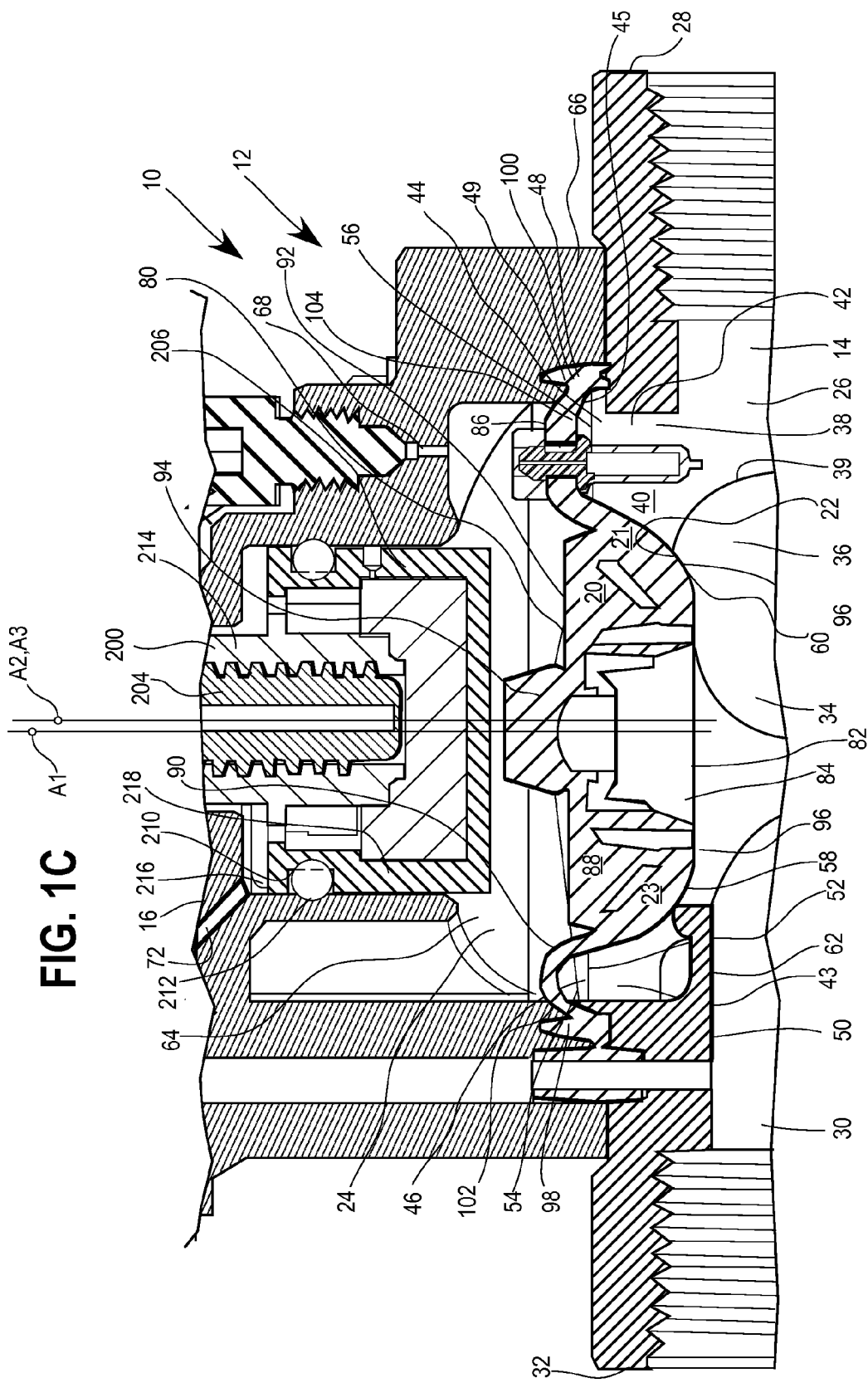
FIG. 1C is a close-up view of a portion of the cross-sectional view of FIG. 2.
Figure 1D:
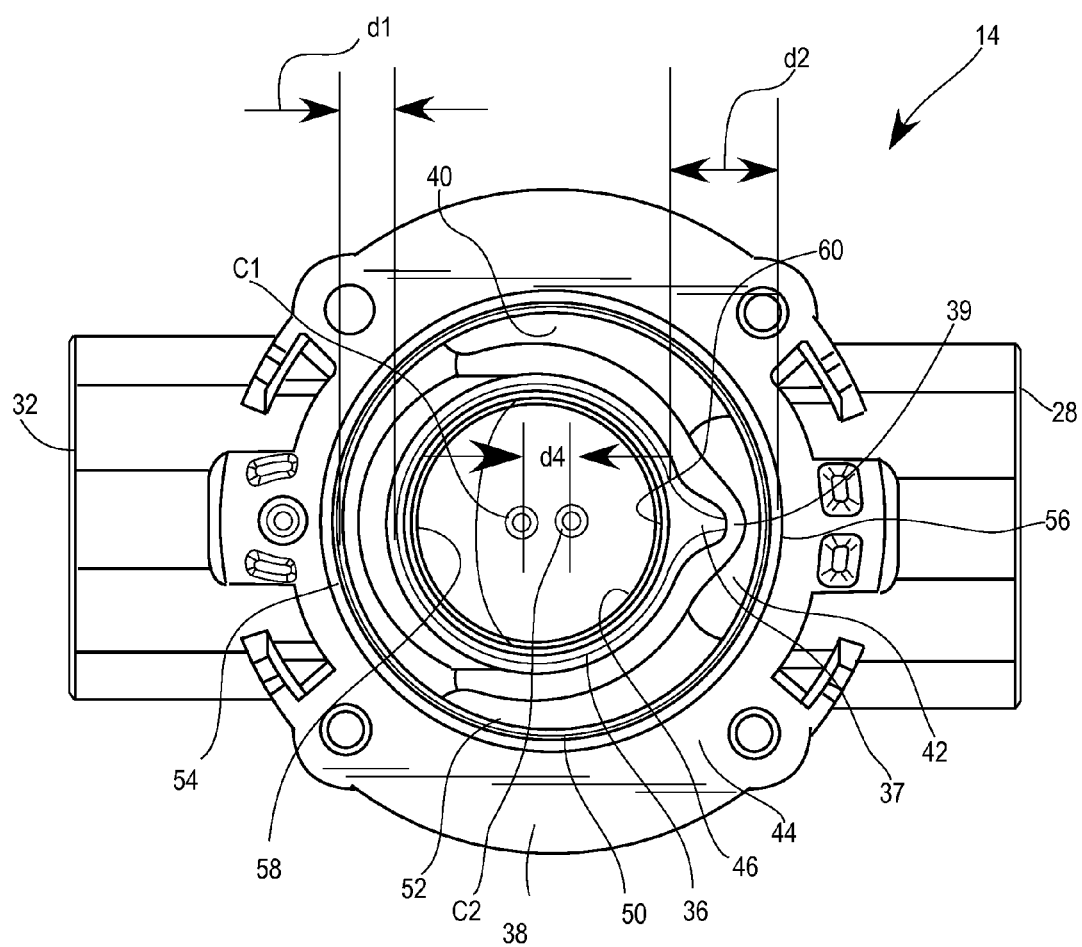
FIG. 1D is a top plan view of a valve body component of the diaphragm valve of FIG. 1.

Referring to FIGS. 1B-C, a lower side 82 of the diaphragm 20 faces the valve seat 22 while an upper side 80 faces the bonnet 16 and flow-control assembly 200. The upper side 80 forms the bottom surface of the control chamber 24. An insert 84 also may be embedded within the diaphragm 20 to stiffen the diaphragm when desired. A filtered through-hole 86 on the diaphragm 20 enables flow from the inlet passage 30 to the control chamber 34.

The diaphragm 20 has a generally off-centered thickened portion 88 within the outer perimeter 48 and that extends both above and below a connection with a thin web 90 that extends between the thickened portion 88 and the outer perimeter 48 of the diagram 20. The web 90 has an outlet side 102 located by the outlet side 54 of the upper rim 44 and an inlet side 56 of the upper rim 44. On the upper side 82 of the diaphragm 20, the thickened portion 88 extends upward to form a generally flat, disc-shaped portion 92 of the diaphragm 20. A peg 94 extends upward from the center of the disc-shaped portion 92, and although all forms do not need the spring 70, the peg 94 may be used to anchor the spring 70 if desired. On the lower side 80 of the diaphragm 20, the thickened portion 88 has a convex outer bottom surface 96 for engaging the valve seat 22. In one form, the convex profile of the bottom surface 96 is generally bowl shaped. Both the thickened portion 88 and the outer perimeter 48 are circular, but may be other shapes as mentioned above.

As illustrated in FIG. 1E, the thickened portion 88 defines a center point C3 and the outer perimeter 48 defines a center point C4. The thickened portion 88 is centered on the valve seat 22 so that the center point C3 of the thickened portion and the center point C1 of the valve seat 22 are at least substantially on the same vertical axis A1. Thus, the thickened portion 88 also is substantially concentric to the valve seat 22. Since the outer perimeter 48 of the diaphragm 20 aligns with the upper rim 44 of the valve body 14, the center point C4 of the outer perimeter 48 of the diaphragm 20 and the center point C2 of the inlet chamber 40 are on the same vertical axis A2 and, thus, are also concentric to one another.

Since the thickened portion 88 aligns with the valve seat 22, and the outer perimeter 48 aligns with the upper rim 22 and inlet chamber 40, the diaphragm 20 has the same, or nearly the same, offset distance to that of the valve body 14. Thus, the center points C3 and C4 of the diaphragm are offset a distance d3 (FIG. 1E) which is the same as the offset distance d4 between center points C1 and C2 (or axes A1 and A2) (FIG. 1D).

In one form, the offset distances d3 and d4 are approximately 0.05 to 0.15 inches (1.3 to 3.8 mm), and in another form, approximately 0.1 inches (2.5 mm) for a one-inch valve (i.e., a valve that attaches to one inch pipes). In another form, the offset d3 or d4 is a percentage of the valve or pipe size such as about 5-15%, and in one form, about 10% of the valve size. The difference between d1 and d2 is the same length as the offset.

Since the thickened portion 88 is placed concentrically on the valve seat 22, the center point C3 of the thickened portion 88 is closer to the outlet end 32 than the center point C4 of the outer perimeter 48. This in turn places the thickened portion 88 closer to the outlet end 32 than the inlet end 28. The outer perimeter 48 has an outlet side 98 and an opposite inlet side 100 near the inlet side 60 of the valve seat 22 and the inlet entrance area 42. Thus, the thickened portion 88 is closer to the outlet side 98 of the outer perimeter 48 than the inlet side 100 of the outer perimeter 48.

To facilitate the hinging and stretching of the diaphragm 20, the diaphragm may be made of nitrile rubber, Ethylene Propylene Diene Monomer (EPDM) rubber, or any other elastic material sufficient to provide the characteristics of the diaphragm described herein. In one form, the diaphragm 20 provides a bias to its configuration in the closed state engaging the valve seat 22.

Figure 1F:
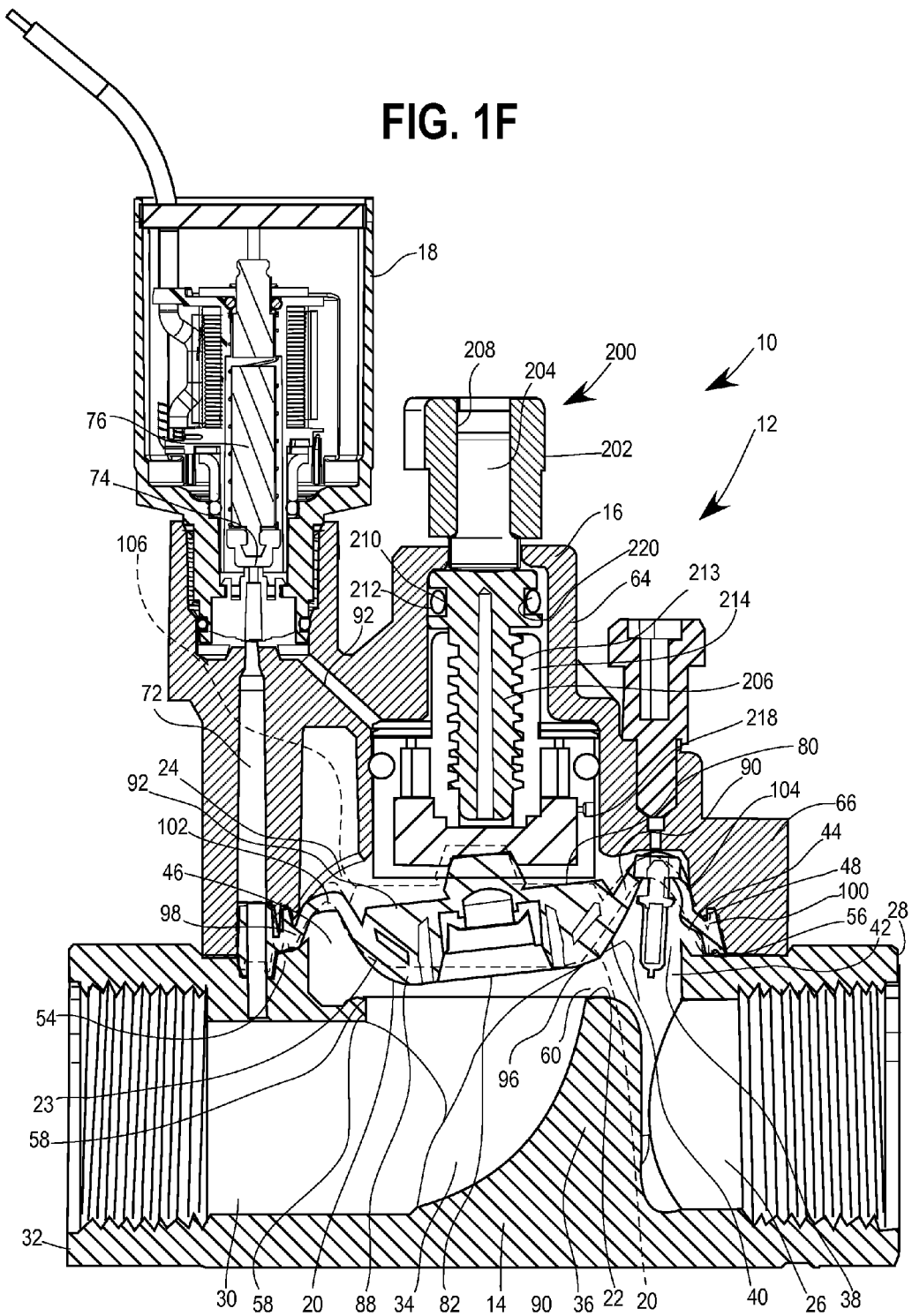
FIG. 1F is a side cross-sectional view of the diaphragm valve of FIG. 1 shown in an open state.

With this configuration, the outlet side 102 of the web 90 has a smaller radial width (d5 in FIG. 1D) than the radial width (d6) of the inlet side 104 of the web 90 where in one form, distances d5 and d6 correspond respectively to distances d1 and d2. Thus, the difference between d5 and d6 is the same length as d3. During the opening of the valve 10, as the diaphragm 20 lifts off of the valve seat 22 under fluid pressure and against the bias of the diaphragm 20 (and the spring 70 if present), the longer inlet side 104 shifts vertically higher than the outlet side 102, which results in a hinging action at the outlet side 102 so that the diaphragm 20 pivots to a slanted orientation (FIG. 1F). This configuration also provides a larger surface area on the web 90 near the inlet side 42 of the inlet chamber 40 than by the opposite outlet side 58 of the valve seat 22, initially resulting in more fluid pressure from incoming flow on the inlet side 104 versus that on the outlet side 102. With the hinging action and added pressure on the inlet side 104, the diaphragm 20 initially lifts vertically off of the valve seat 22 higher at the inlet side 60 of the valve seat 22 than at the outlet side 58 of the valve seat 22. In order to limit over rotation of the diaphragm 20, the inlet side 102 of the web 90 is thicker than the web's outlet side 104 to slightly stiffen the inlet side 102. Over rotation can place the relatively thinner web outlet side 104 too close to the valve seat 22 where it may impact fluid pressure sufficiently high to damage the thinner area 102 of the web 90. The structure described above results in more direct and smoother flow through the valve while the diaphragm 20 moves to a fully open position as well as a gradual pressure change when the diaphragm 20 closes the valve seat 22.

In operation, in a closed condition of the valve 10, the solenoid actuator 18 will close the bypass passage 72, and the control chamber 24, as well as the annular inlet chamber 40, will fill with fluid. Since the diaphragm 20 has a greater surface area in the control chamber 24 on its upper side 80 compared to the annular surface area on the lower side 82 of the diaphragm over the inlet chamber 40, the higher forces from the fluid in the control chamber 24 combined with the biases of the diaphragm 20 and spring 70 if present holds the diaphragm 20 against the valve seat 22. The diaphragm 20 will remain at its closed position and engaged with the valve seat 22 as long as the fluid in the control chamber 24 provides at least about 60% of the supply pressure (referred to as the cracking pressure where the total forces on the two sides of the diaphragm are at an equilibrium).

Once an electrical signal is sent to the solenoid actuator 18 to open the bypass passage 72, fluid flow is permitted between the control chamber 24 and the outlet passage 30. The release of pressure in the control chamber 24 will cause the fluid in the inlet chamber 40 to force the diaphragm 20 to rise off of the valve seat 22 and against the bias of the diaphragm, and the spring if present, as described above, by initially pivoting the diaphragm 20 to a tilted orientation (FIG. 1F) during the transition period so that the valve seat 22 is open wider at the inlet side 60 of the valve seat 22 versus the outlet side 58 of the valve seat 22. This positions more of the incoming flow on the inlet side 42 versus on the outlet side 43 of the inlet chamber 40 to provide a relatively more direct flow to the inlet side 60 of the valve seat 22 while the diaphragm 20 is moving upward. Hinging the diaphragm 20 near the outlet sides 43, 58 to open the diaphragm 20 wider at the inlet sides 42, 60 allows the diaphragm to guide more of the flow over the inlet side 60 of the valve seat 22 for smoother flow through the valve.

By offsetting the valve seat 22 toward the outlet end 32, the inlet chamber 40 has more space on its inlet side 42 to receive more of the incoming flow within the inlet chamber 40. In the illustrated example, for an offset d4 of 0.1 inches for a one-inch valve, radial width d2 at the inlet entrance area 42 is increased from 0.29 inches (on concentric valves) to 0.39 inches (for eccentric valve 10). This is an approximately 35% increase in length. In one form, the radial width d2 may be increased from about 17% to about 50%. As mentioned above, the larger inlet entrance area 42 provides smoother flow due in part to less of a bottleneck and enables relatively wider turns, which reduces pressure loss due to friction and energy loss from relatively sharper turns in the fluid flow. These features combine to reduce the pressure loss over valves using concentrically located valve seats.

From the slanted orientation, the diaphragm 20 will stretch and continue to shift upward until the diaphragm 20 levels out to a generally horizontal position 106 (shown in dashed line on FIG. 1F) or other position where the diaphragm presses upward against the flow-control assembly 200, if present, or the upper surface of the control chamber 24. The open valve 10 will eventually stabilize at a certain flow rate with the diaphragm 20 in a fully opened position, such as the level orientation illustrated in FIG. 1F.

Once the solenoid actuator 18 is deactivated to close the bypass passage 72, high-pressure fluid upstream of the diaphragm 20 still feeds high pressure fluid into the control chamber 24 through the filtered through-hole 86. Because there is nowhere for the high-pressure fluid to go, pressure in the control chamber 24 rises to nearly the high incoming line pressure until the diaphragm 20 is forced back toward the valve seat 22. The diaphragm 20 closes with the reverse process as described for opening the valve. Thus, the diaphragm 20 first reverts back to the slanted orientation. Then, the diaphragm 20 closes with the same pivoting action as when the diaphragm 20 opened except in reverse due to the smaller web at the outlet side 102 as opposed to the inlet side 104. This pivoting action will cause the diaphragm 20, and specifically the thickened portion 88, to first engage the outlet side 58 of the valve seat 22 and pivot down along the valve seat 22 toward the inlet end 28 until the diaphragm 20 engages the inlet side 60 of the valve seat 22 to completely close the valve seat 22. This relatively gradual manner of closing the valve seat 22 limits the risk of water hammer. It will be understood that gradual here refers to engagement between different parts of the bottom surface 82 of the diaphragm 20 and the valve seat 22 occurring intentionally and substantially non-simultaneously as the valve is being closed even though the actual gradual process of closing once first engaged with the valve seat 22 could occur relatively quickly (for example, a small number of seconds).

Referring again to FIGS. 1A, 1B, and 1F, the diaphragm valve 10 includes a flow-control assembly 200 to adjust the flow rate of fluid available through the diaphragm valve 10. More precisely, the flow-control assembly 200 controls the operating pressure of the valve. To accomplish this, the flow-control assembly 200 controls the maximum spacing between the diaphragm 20 and the valve seat 22 when the diaphragm valve 10 is in the open position. Increasing the spacing between the diaphragm 20 and the valve seat 22 will increase the flow rate through the valve seat 22, while decreasing the spacing between the diaphragm 20 and the valve seat 22 will decrease the flow rate through the valve seat 22. In this manner, the flow rate of fluid through the diaphragm valve 10 can be coordinated to the requirements of the irrigation system in which the diaphragm valve 10 is installed.

Flow-control assembly 200, in one form, is a non-rising type flow control and includes a handle 202, drive cylinder 204, and a translatable stop member 206. The drive cylinder 204 is disposed in an opening 208 defined by the handle 202, and the handle 202 matingly engages the drive cylinder 204 so that rotation of the handle 202 rotates the drive cylinder 204. The drive cylinder 204 includes an annular groove 210 supporting an o-ring or quad-ring 212 which seals the drive cylinder 204 with a bore 220 of the bonnet 16. The drive cylinder 204 has a threaded end 213 opposite the handle 202 and disposed at least partially within translatable stop member 206. In one form, only a few thread rotations are provided so that as the thread dimensions vary over time in the production/molding process the threads do not bind up. In one form, the threads are left-hand threads so that as the handle 202 is rotated clockwise, top looking down, the stop member 206 will be driven down to limit movement of the diaphragm 20.

The translatable stop member 206 further includes an interiorly threaded portion, such as a cylinder 214, that engages the threads of the drive cylinder 204. A ledge 216 extends radially outward from the cylinder 214 to a relatively wide cylindrical portion 218. It will be noted that the cylindrical portion 218 may have many different shapes as long as it is shaped to engage and retain the upward motion of a diaphragm, such as non-circular or solid, rather than cylindrical to name a few examples. The translatable stop member 206 is rotationally secured to the inside of the bore 220 within the bonnet 16 by projections extending outward from the cylinder 214 and into grooves in the bonnet 16 (or vice-versa) so that rotation of handle 202 simply translates into linear reciprocation of the stop member 206 without rotational movement.

The flow-control assembly 200, and specifically the cylindrical portion 218, defines a longitudinal axis A3 that, in one form, is aligned with the vertical axis A2 of the upper rim 44 of the component 20, the inlet chamber 40, and the outer perimeter 48 of the diaphragm 20. When the diaphragm 20 engages the cylindrical portion 218, and in one form the thickened portion 88, it does so in a non-concentric manner such that the longitudinal axis A3 of the flow-control assembly 200 valve seat 22 is offset from the vertical axis A1 of the valve seat 22 and center point C3 of the thickened portion 88 of the diaphragm. In this case, the vertical axis A1 and center point C3 are closer to the outlet side 54 of the upper rim 44 than the longitudinal axis A3. When the cylindrical portion 218 is set sufficiently low to engage the diaphragm 20, this configuration causes the cylindrical portion 218 to initially engage the diaphragm 20 on the inlet side 21 before engaging the diaphragm 20 on its outlet side 23 (FIG. 1F). Thus, at least during the transition period between the open and closed positions, the cylindrical portion 218 may not contact the diaphragm's outlet side 23 due to the slanted orientation of the diaphragm 20 even though the cylindrical portion 218 still adequately limits further upward motion of the diaphragm 20 to obtain a desired maximum flow rate. Once the valve 10 stabilizes at a certain flow velocity, the diaphragm 20 may engage the entire circumference of the terminal end of the cylindrical portion 218. In this configuration, the diaphragm 20 would extend generally horizontal. In order to limit leakage of fluid out of the control chamber 24, the cylindrical portion 218 also has an annular groove 222 to support a seal such as an O-ring or quad-ring 224.

Figure 2:
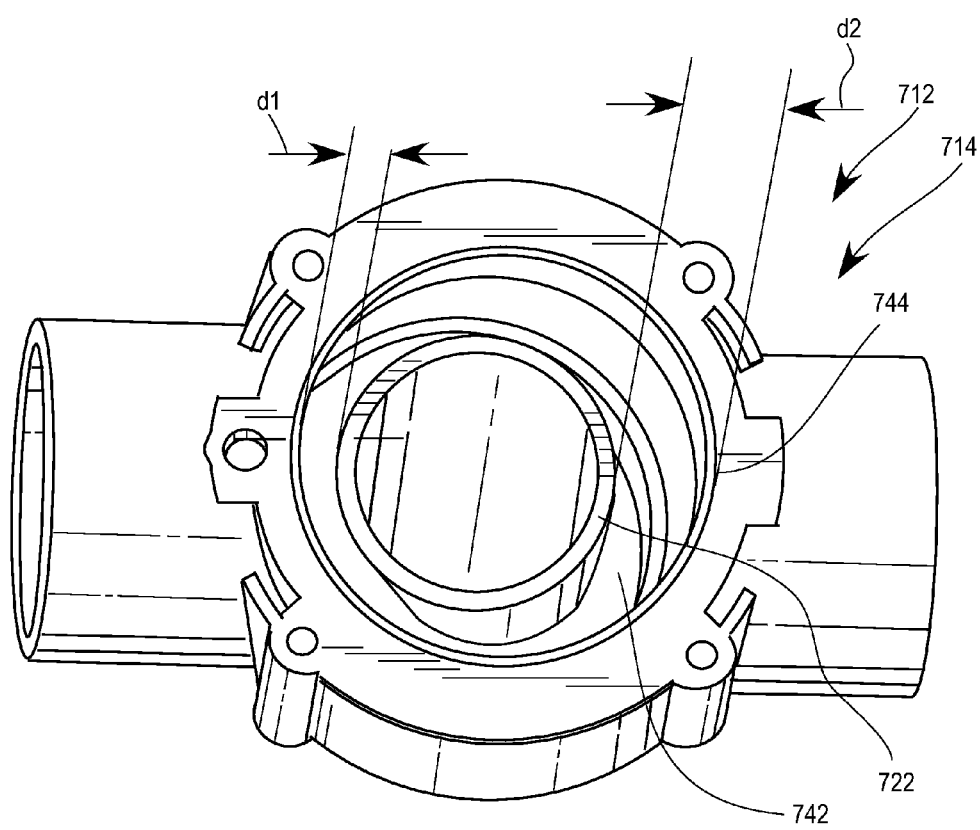
FIG. 2 is an upper perspective view of an alternative valve body component.
Figure 4C:
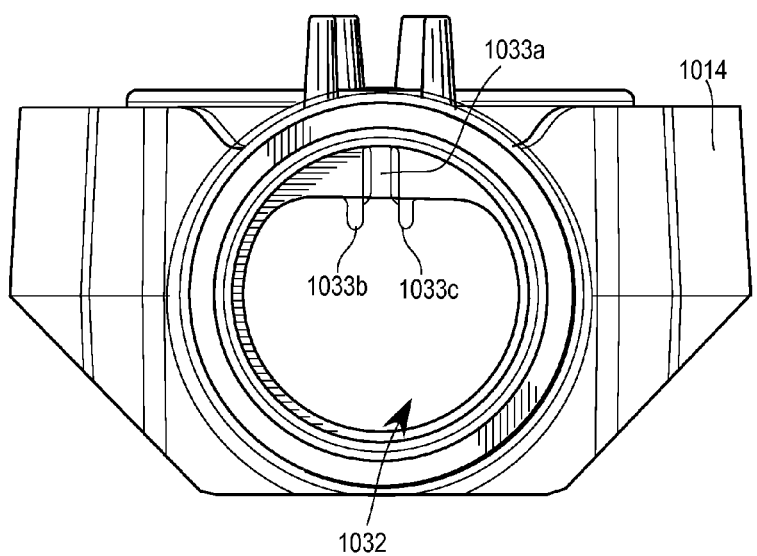
FIGS. 4C and 4D are rear elevation and cross-sectional views of the valve body of FIGS. 4A-B, with the cross-section of FIG. 4D being taken along line 4D-4D illustrated in FIG. 4B.
Figure 4D:
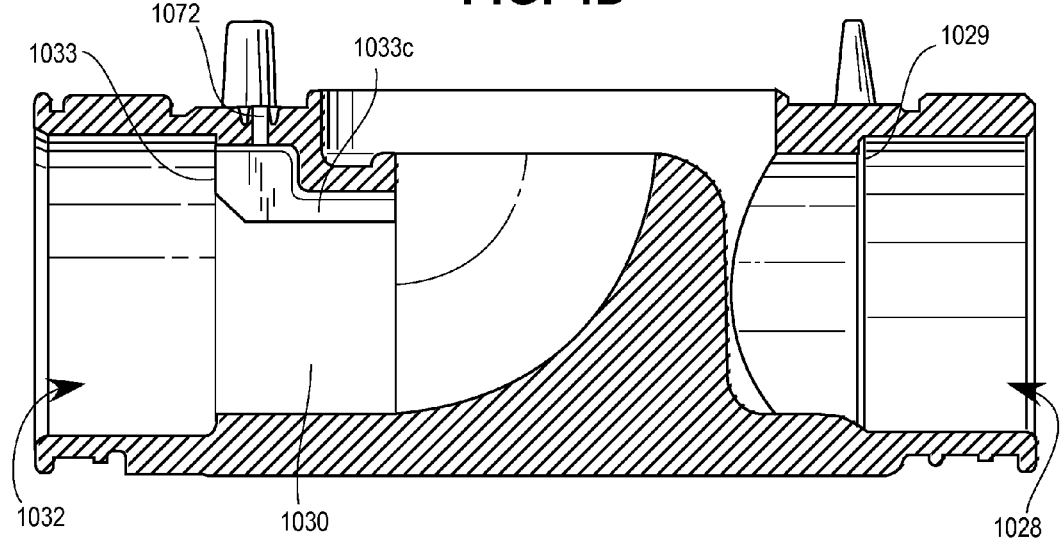
Figure 5A:
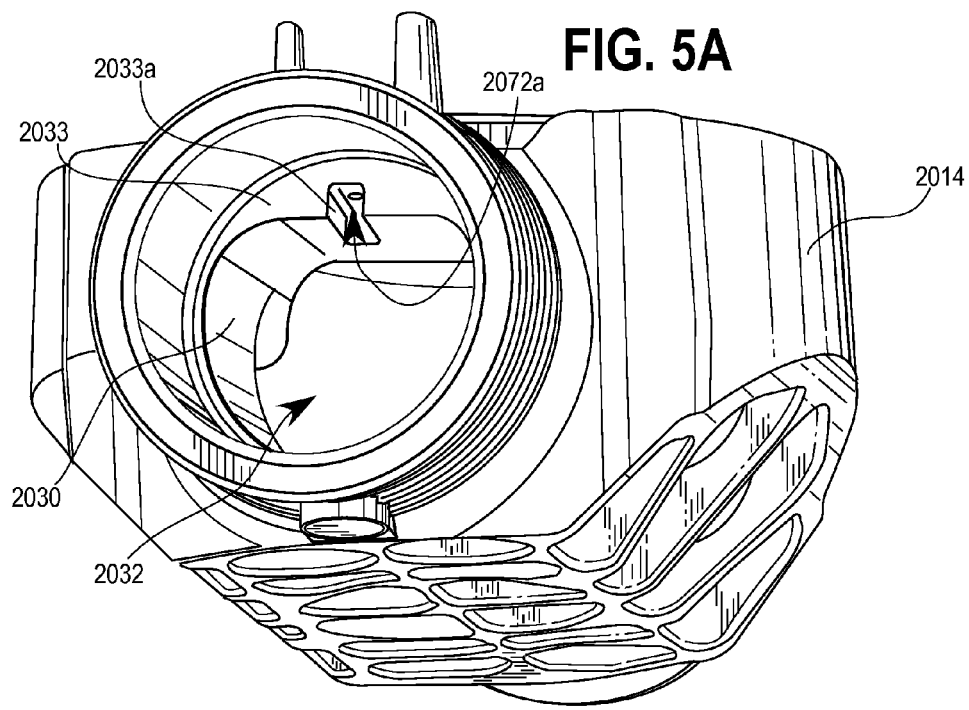
FIGS. 5A and 5B are rear and front perspective views, respectively, of a valve body having a slot only configuration in accordance with the invention with FIG. 5A illustrating the outlet end of the valve body viewed slightly from below and FIG. 5B illustrating the inlet end of the valve body viewed from above.
Figure 5B:
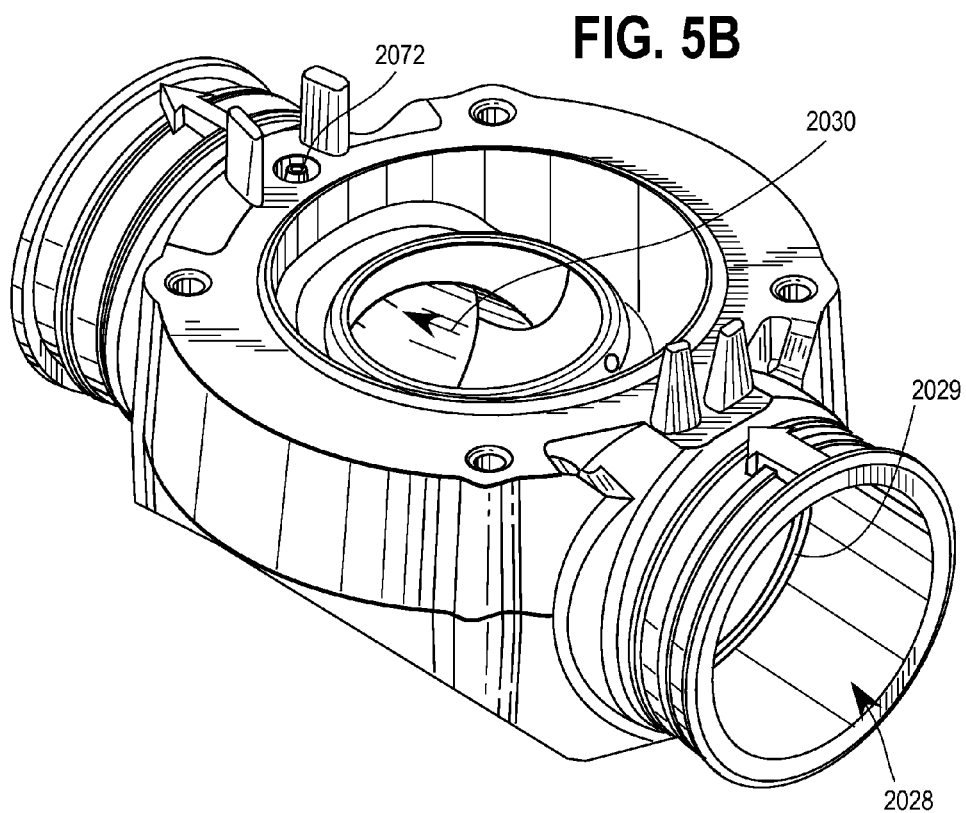
Figure 5C:
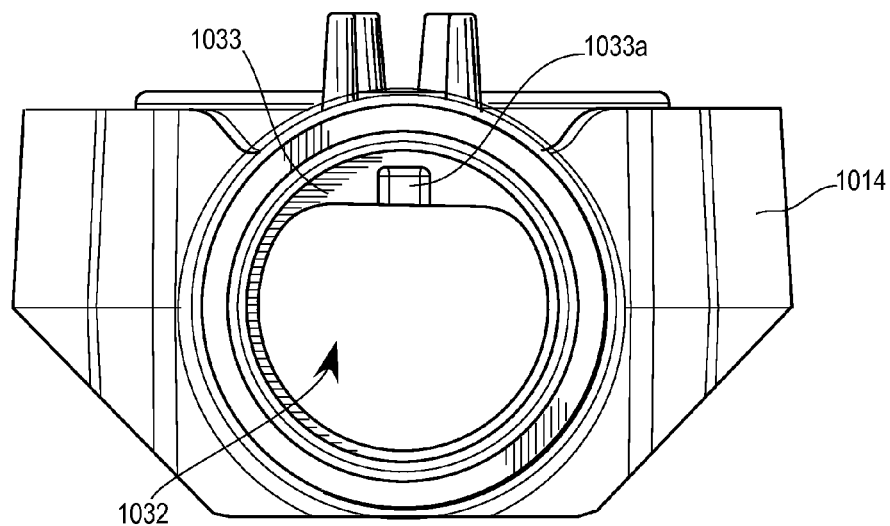
FIGS. 5C and 5D are rear elevation and cross-sectional views of the valve body of FIGS. 5A-B, with the cross-section of FIG. 5D being taken along line 5D-5D illustrated in FIG. 5B.
Figure 5D:
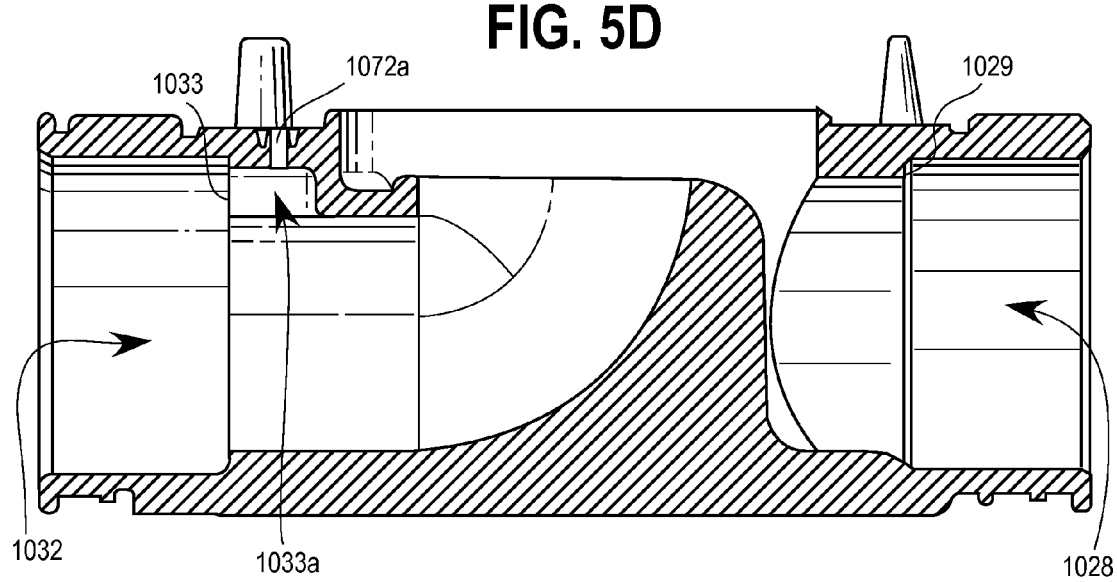
Figure 6A:
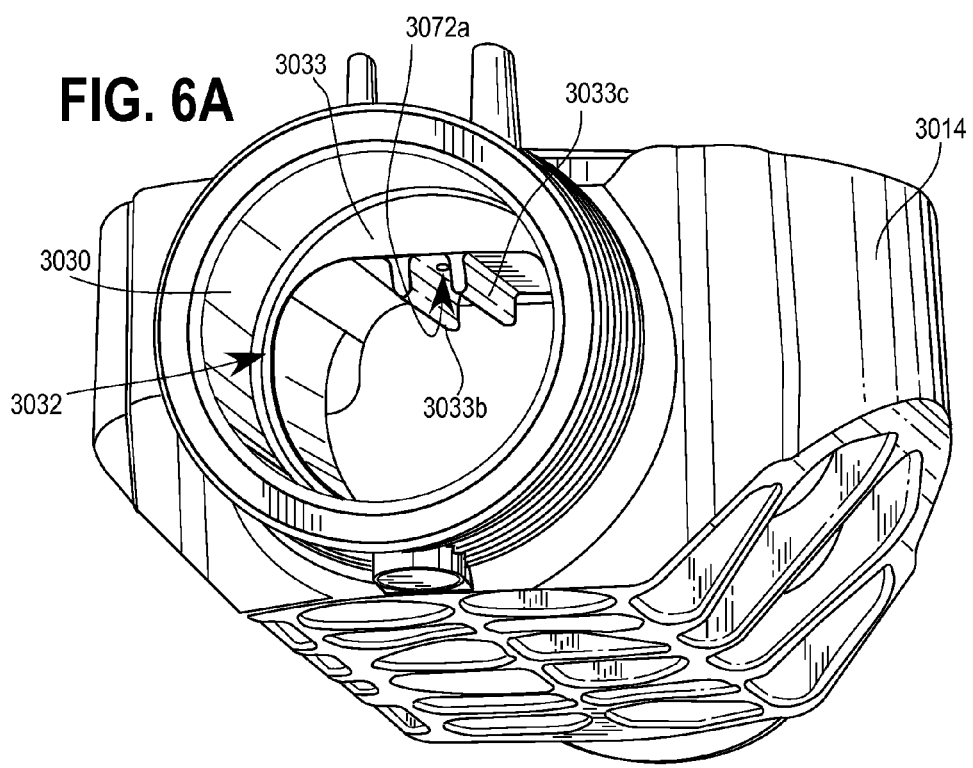
FIGS. 6A and 6B are rear and front perspective views, respectively, of a valve body having a rib only configuration in accordance with the invention with FIG. 6A illustrating the outlet end of the valve body viewed slightly from below and FIG. 6B illustrating the inlet end of the valve body viewed from above.
Figure 6B:
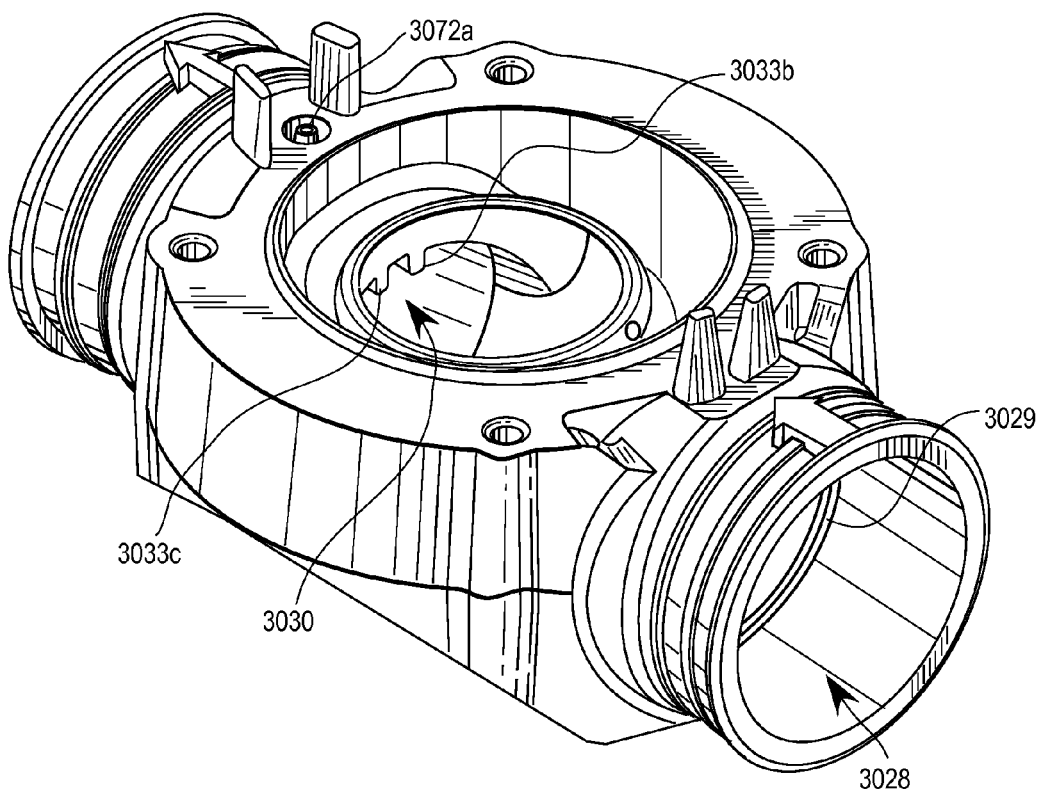
Figure 6C:
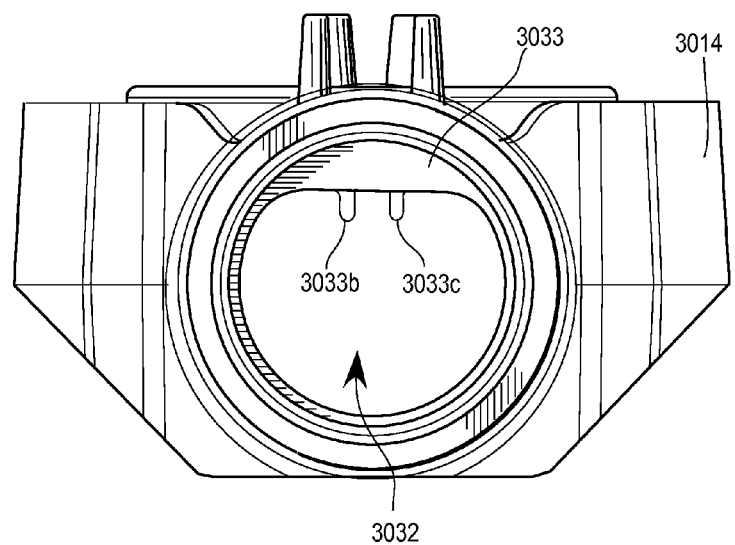
FIGS. 6C and 6D are rear elevation and cross-sectional views of the valve body of FIGS. 6A-B, with the cross-section of FIG. 6D being taken along line 6D-6D illustrated in FIG. 6B.
Figure 6D:
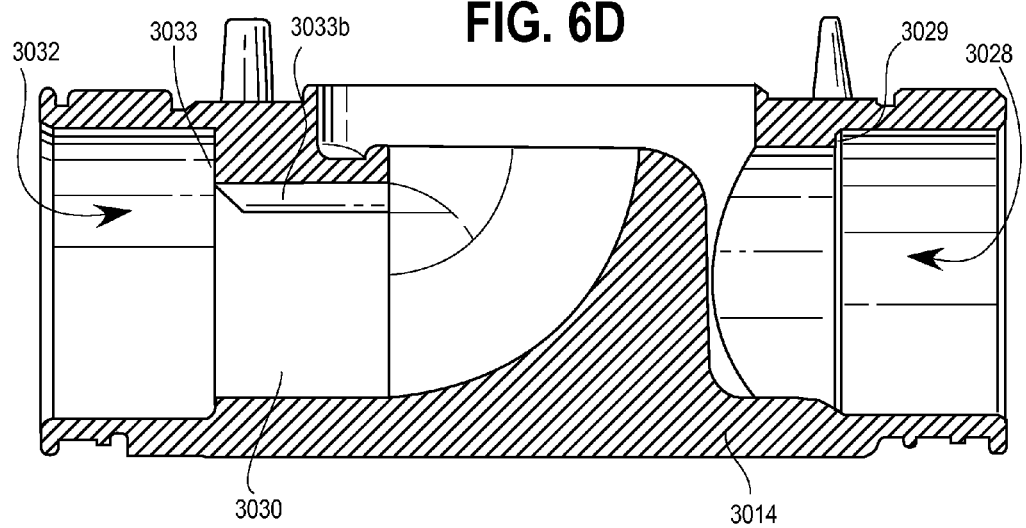

Referring to FIG. 2, an alternative valve body 714 does not include a flaring fin but, otherwise, generally has the same or similar features as valve body 14. These similar features include the offsets and a distance d1 on the outlet side shorter than a distance d2 on the enlarged inlet side (inlet entrance area) 742 between an upper rim 744 of the valve body 714 and a valve seat 722 to achieve the smooth, uniform flow, as well as the hinging action of the diaphragm. Here, the elements of valve body 714 similar to that on valve 10 are numbered similarly except with a "7" in front of the number.

Referring to FIG. 3, an alternative diaphragm valve 800 does not include a flow-control assembly. Otherwise, elements of valve 800 similar to that on valve 10 are numbered the same except with an "8" placed in front of the reference number. Except for the features related to the flow-control assembly, valve 800 has the same or similar dimensions, offsets, and distances, and therefore benefits, as in valve 10.

As mentioned above, although the valves illustrated thus far have shown female threaded inlet and outlet openings (e.g., 26, 28), it should be understood that in alternate embodiments the valves may utilize any conventional openings, such as male threaded openings, slip fit openings, barbed openings, or any combination of such openings, as may be desired for a particular application (e.g., male×barb, etc.). As also mentioned above, some problems are known with respect to clogging of the control chamber exit or bypass passage or valve body dump hole due to installation practices. More particularly, when installers use adhesives, such as PVC cement or glue, the adhesive often times partially or fully blocks the valve body dump hole which results in less than optimal valve performance or even stops the valve from working completely. This may occur for any number of reasons (e.g., the adhesive may inadvertently be directly applied to the body dump hole; an excessive amount of adhesive may be used causing some adhesive to flow into engagement with or cover the body dump hole; adhesive may be applied while the valve body is inverted or tilted; and/or adhesive may be pushed toward the body dump hole when the PVC pipe is inserted into the outlet (or pressed home) during bonding). In In FIGS. 4A-D, an alternate embodiment of the invention disclosed herein is illustrated that addresses such problems and concerns. For convenience, items in FIGS. 4A-D that are similar to those discussed above will use similar reference numerals, but have the prefix "1" or "10" added to the reference numeral to keep all reference numerals in the one thousand range to distinguish one embodiment from the others. In view of this, all details about common items will not be repeated in an effort to avoid being redundant or duplicative.

In FIGS. 4A-D, the valve 1010 includes a valve body 1014 to which a diaphragm (e.g., similar to diaphragm 20), bonnet or cover (e.g., similar to bonnet 16) and solenoid actuator (e.g., similar to solenoid 18) would be connected. In this embodiment, the valve body 1014 is shown with slip type inlet and outlet openings 1028, 1032, respectively. In order to connect the valve 1010 into an irrigation system, conduit such as PVC piping would be slid or inserted into the inlet and outlet openings 1028, 1032. An adhesive, such as PVC cement or glue, would be applied around the distal ends of the PVC piping to be inserted into openings 1028, 1032 and/or around the inside surfaces of the inlet and outlet openings 1028, 1032. Backstops or walls 1029, 1033 are provided to prevent the PVC piping from being inserted too far into the inlet and outlet openings 1028, 1032, respectively, and/or to provide a surface or structure that give the installer an indication that the pipe is inserted into the inlet or outlet a sufficient distance to make a good connection to prevent the PVC piping from being inserted too far. These walls 1029, 1033 essentially form a shoulder or stop that the PVC piping abuts when fully inserted into the valve body 1014.

In order to prevent the adhesive from clogging the solenoid bypass passage or valve body dump hole 1072a located in outlet 1032, the outlet backstop or abutting surface 1033 defines a recess 1033a within which the valve body dump hole 1072a is disposed or situated and, preferably, where the valve body dump hole 1072a terminates. Thus, should an installer insert an adhesive applicator into the valve outlet 1032, the stop 1033 and recess 1033a defined therein will prevent the applicator from applying glue over the valve body dump hole 1072a. This configuration allows the valve body dump hole or opening 1072a to be recessed into the normal valve outlet passage wall 1030 for protection from clogging with adhesive while maintaining the regular or normal valve outlet passage 1030 so as not to disturb fluid flowing through the valve outlet passage 1030.

In the form illustrated, the stop 1033 does not extend across the recess 1033a (i.e., downstream of the recess) to prevent adhesive from being pushed into the recesses because such a wall would make the valve body 1010 difficult to injection mold and would disrupt water flow through the valve 1010 which is not desirable due to how such disruptions affect not only the valve's performance and operation but also affect the system as a whole and, in particular, downstream components of the system. Such a wall also could provide another surface upon which grit or debris may collect and, overtime, interfere with the desired operation of the valve 1010. Notwithstanding any of this, however, it should be understood that in alternate embodiments, such a wall could be molded into the valve body 1014 if desired. Similarly, alternate structures that perform the same task (i.e., blocking flow of adhesive into recess 1033a) may be inserted into the valve if desired (e.g., such as a meshed member or screen that effectively blocks flow of adhesive but, yet, allows fluid to flow through the member or screen, etc.).

In the form illustrated, the valve body 1014 includes one or more protrusions or projections, such as ribs 1033b and 1033c, which provide surfaces that excessive adhesive may flow along to divert the excessive adhesive from obstructing or clogging the valve body dump hole 1072a. In addition, the downstream surfaces of the ribs 1033b, 1033c which face the outlet opening 1030 are preferably tapered to provide a surface that will deflect an adhesive applicator inserted into outlet opening 1030 away from the valve body dump hole 1072a. The angled or tapered downstream surfaces of ribs 1033b, 1033c (as well as remaining surfaces of these ribs), further wick or draw away adhesive that starts to move or drip if the valve body is inverted or tilted while a PVC pipe is inserted into the outlet opening 1030 for bonding the pipe to the valve.

In a preferred form, the ribs 1033b, 1033c are shaped as narrow wall members having a longitudinal length that runs generally parallel to the center axis of outlet opening 1032 and outlet passage 1030. Thus, the valve body dump hole or opening 1072a is allowed to be recessed in the normal inner passage 1030 of outlet 1032 without a downstream wall to prevent negatively impacting fluid flow through the valve body dump opening 1072a and fluid flow through the valve body 1014 itself. The wicking surfaces of ribs 1033b, 1033c may be introduced separate and apart from the valve body dump opening 1072a to draw adhesive away from the valve body dump opening 1072a without adding much, if any, disturbance to the fluid flowing through valve 1010 (e.g., the flat/slender and long shape of the ribs 1033*b*, 1033*c* provide minimal interference with or disturbance to the fluid flowing through valve 1014).

Although the embodiments illustrated in FIGS. 4A-D illustrate ribs with generally flat or blunt upstream and downstream ends, it should be understood that in alternate embodiments one or more of these ends may be rounded, tapered or even bladed to further reduce any impact these structures have on fluid flowing through the valve body 1014. For example, in one form, the upstream surfaces of ribs 1033*b*, 1033*c*, which face the diaphragm of the valve assembly may be tapered or bladed so that the ribs 1033*b*, 1033*c* create minimal disturbance to fluid flowing through the valve from inlet 1028 to outlet 1032 and so that the ribs 1033*b*, 1033*c* do not provide a larger surface upon which debris may collect and build. In still other forms, both the upstream and downstream faces of the ribs 1033*b*, 1033*c* may be tapered or bladed for these purposes. Similarly, in other forms, the upstream and downstream surfaces, as well as the bottom surfaces or distal ends of the ribs 1033*b*, 1033*c* which face the center axis of the outlet opening 1032, may be tapered or bladed as well for these purposes.

In the form illustrated, ribs 1033*b*, 1033*c* are illustrated as flat, elongated walls that extend downward from the inner wall that defines outlet passage 1030. The ribs 1033*b*, 1033*c* run parallel to one another and are positioned on opposite sides of the valve body dump opening 1072*a* and are structures that are separate and apart from the valve body dump opening 1072*a*. In the form illustrated, the ribs 1033*b*, 1033*c* extend down from the wall defining outlet passage 1030 by approximately one hundred thirty-one thousandths of an inch (0.131"), but in alternate forms, these ribs could extend down to the horizontal center line of the outlet passage, approximately four hundred eight thousandths of an inch (0.408"). In the form illustrated the ribs are seventy four thousandths of an inch (0.074") wide and are spaced apart from one another by approximately one hundred thirty six thousandths of an inch (0.136"). In alternate forms, it should be understood that these ribs 1033*b*, 1033*c* may be positioned closer to one another or further apart. In a preferred form, however, the spacing of the ribs 1033*b*, 1033*c* is set such that conventional adhesive applicators cannot be inserted between the ribs 1033*b*, 1033*c*. In view of known adhesive applicator widths, ribs 1033*b*, 1033*c* will preferably be spaced apart in an amount ranging between eighty-two thousandths of an inch and one hundred ninety thousandths of an inch (0.081" to 0.191"), or plus/minus forty percent (±40%) of the width shown in FIGS. 4A-D. The recess 1033*a* is preferably designed to match the width of the ribs 1033*b*, 1033*c*. Thus, in preferred forms, the recess will have a width ranging between eighty-one thousandths of an inch and one hundred ninety thousandths of an inch (0.081" to 0.191"). It should be understood, however, that in alternate embodiments it may be desired to set the width of the recess 1033*a* narrower than the width or spacing between the ribs 1033*b*, 1033*c*.

Similarly, although two ribs are illustrated, it should be understood that in alternate forms one or more ribs may be used. For example, in one form a single rib may extend from the inner wall that defines outlet passage 1030 and may be aligned with the valve body dump opening 1072*a* such that the rib is broken up into a forward or upstream portion and a rearward or downstream portion located on opposite sides of valve body dump opening 1072*a* yet aligned with one another. In such a form, the rib would preferably be no thicker than the outer diameter of the valve body dump opening 1072*a* (e.g., sixty-two thousandths of an inch (0.062")) in order to prevent the rib from having portions that extend about opposite sides of the valve body dump opening 1072*a*. In still other forms, many more ribs may be used such as a plurality of ribs equally spaced about the periphery of the wall defining outlet passage 1030. For example, in one form, such a plurality of ribs may be used to form the stop or abutting walls for the PVC piping instead of wall 1033.

In yet other forms, the valve body 1014 may be provided solely with a recess (see FIGS. 5A-D) or solely with one or more ribs (see FIGS. 6A-D). In keeping with the above practice, items that are similar to the embodiment of FIGS. 4A-D have been identified with similar reference numerals, but using the prefix "2" or "20" for FIGS. 5A-D and the prefix "3" or "30" for FIGS. 6A-D and will not be repeated here to avoid redundancy or duplicity. Thus, an exemplary embodiment of an alternate recess only valve body is illustrated in FIGS. 5A-D and referenced generally by reference numeral 2014, and an exemplary embodiment of an alternate rib only valve body is illustrated in FIGS. 6A-D and referenced generally by reference numeral 3014. In a preferred form, however, both the recess and rib features will be utilized for the reasons discussed above with respect to FIGS. 4A-D.

Thus, with the above-mentioned configurations, there are provided numerous embodiments for hindering clogging of a valve port. For example, a clog resistant valve body is disclosed having an inlet passage, an outlet passage having a longitudinal axis and a stop positioned therein for ceasing forward progress of a pipe inserted into the outlet passage, the stop defining at least one of a recess and a rib, a valve seat intermediate the inlet passage and outlet passage, and a bypass passage positioned generally transverse to the longitudinal axis of the outlet passage and terminating at one end proximate the at least one of a recess and a rib so that the at least one of a recess and a rib help prevent adhesive from clogging the bypass passage. In one form, the stop defines a flat wall extending from an inner surface of the valve body and having a downstream face that faces a downstream opening of the outlet passage. The stop together with the inner surface defines the outlet passage and the recess forms a depression in the outlet passage that surrounds the bypass passage on at least three sides. The stop defines first and second side walls and a recessed upstream wall located between the first and second side walls to form the depression surrounding the bypass passage on three sides. Thus, the depression leaves an unobstructed downstream passage for fluid exiting the bypass passage to flow through unobstructed while positioning the side walls close enough to one another to prevent an adhesive applicator from coming into contact with the bypass passage. The stop may further define at least one rib extending from the outlet passage positioned proximate the bypass passage to further assist in preventing the adhesive applicator from coming into contact with the bypass passage. In a preferred form, the at least one rib comprises a plurality of ribs extending about the outlet passage and having at least one rib positioned proximate the bypass passage to further assist in preventing the adhesive applicator from coming into contact with the bypass passage. For example, the plurality of ribs may comprise a first rib positioned on one side of the bypass passage and a second rib positioned on another side of the bypass passage opposite the first, with the first and second ribs being positioned close enough to one another to prevent the adhesive applicator from coming into contact with the bypass passage. The first and second ribs preferably form thin walls having upstream and downstream surfaces and elongated side walls, with at least the upstream surfaces being narrow to hinder particle build-up on the ribs and the downstream walls being tapered to help deflect the adhesive applicator away from the bypass passage.

In other forms, the valve body stop may only define at least one rib extending from the outlet passage positioned proximate the bypass passage to assist in preventing an adhesive applicator from coming into contact with the bypass passage. Again, however, in a preferred form, the a plurality of ribs will extend about the outlet passage with at least one rib positioned proximate the bypass passage to further assist in preventing the adhesive applicator from coming into contact with the bypass passage.

Another way of describing an embodiment of the invention is a valve having a body defining an inlet and an outlet, a valve operating in the body between an open position permitting flow from the inlet to the outlet and a closed position preventing flow between the inlet and the outlet, a control chamber communicating with the valve to move the valve between the open and closed positions, a control passage communicating with the control chamber and the outlet, the control passage terminating at the outlet with a control hole, and at least one wall with a surface facing the control hole to protect the control hole from being blocked. The at least one wall may extend along a rib adjacent the control hole. In one form, the at least one wall could be two walls, each having a surface facing the control hole, wherein the surfaces facing the control hole are parallel to one another. The two walls extending along one or more ribs adjacent the control hole. Alternatively, the at least one wall will be three walls, each having a surface facing the control hole. The three walls defining a recess at or about the control hole.

In yet other forms, an entire diaphragm valve may be provided having a valve body having an inlet, an outlet and an internal passage between the inlet and outlet, a diaphragm assembly positioned between the inlet and outlet in the internal passage of the valve body, the diaphragm assembly being movable between a closed position where fluid flow from the inlet to the outlet is blocked and an open position where fluid flow from the inlet to the outlet is permitted, a control chamber disposed on one side of the diaphragm assembly, a control chamber entrance passage to permit fluid to flow into the control chamber, a control chamber exit or bypass passage extending from the control chamber to permit fluid flow from the control chamber (aka a valve body dump hole or opening), a valve positioned to selectively prevent and permit fluid flow through the control chamber bypass passage from the control chamber to control closing and opening of the diaphragm assembly to control flow through the diaphragm valve, and the valve body outlet passage having a longitudinal axis and a stop positioned therein for ceasing forward progress of a pipe inserted into the outlet passage, the stop defining at least one of a recess and a rib to help prevent adhesive from clogging the bypass passage.

Thus, in view of the above, it should be apparent that the clog resistant features discussed herein may be used with a variety of different types of valves and valve bodies and it is contemplated to use these features in this manner. For example, a variety of different valves and valve bodies are illustrated in pending U.S. patent application Ser. No. 13/542,413, filed Jul. 5, 2012, entitled "Diaphragm Valve and Methods and Accessories Therefor" (the '413 application), the disclosure of which is incorporated herein by reference in its entirety. It is contemplated that the above referenced recess and/or rib clog resistant features could be implemented in any of the valves and valve bodies disclosed in the '413 application. It is also contemplated that any of the additional features and accessories disclosed in the '413 application could be implemented in or used with the valves and valve bodies disclosed herein.

In addition to the above apparatus embodiments, it should be understood that numerous methods are also disclosed herein to assist with hindering clogging of the control chamber exit or bypass passage (aka valve body dump opening or hole). For example, methods of manufacturing a valve body resistant to clogging are disclosed comprising providing a valve body having an inlet passage, an outlet passage, a valve seat intermediate the inlet passage and the outlet passage and a bypass passage terminating in a surface that defines the outlet passage, and adding at least one of a recess and a rib to the valve body proximate the bypass passage to help prevent adhesive from clogging the bypass passage.

In other methods, a method of hindering clogging of a bypass passage in a diaphragm valve is disclosed comprising molding a valve body having an inlet passage, an outlet passage, a valve seat intermediate the inlet passage and the outlet passage, and a bypass passage terminating in a surface that defines the outlet passage, and recessing the outlet passage proximate the bypass passage to create walls at least partially surrounding the bypass passage to prevent an adhesive applicator from coming into contact with the bypass passage. The method may further include adding at least one rib proximate the bypass passage to deflect the adhesive applicator away from the bypass passage and wick or draw adhesive away from the bypass passage to prevent partial or total clogging of the bypass passage.

In still other methods, a method of hindering clogging of a bypass passage in a diaphragm valve is disclosed comprising molding a valve body having an inlet passage, an outlet passage, a valve seat intermediate the inlet passage and the outlet passage, and a bypass passage terminating in a surface that defines the outlet passage, and adding at least one rib proximate the bypass passage to deflect the adhesive applicator away from the bypass passage and wick or draw adhesive away from the bypass passage to prevent partial or total clogging of the bypass passage.

While the foregoing describes specific examples, including presently preferred modes of carrying out the invention, those skilled in the art will appreciate that there are numerous variations and permutations of the above-described examples that fall with the scope of the following claims.

What is claimed is:

1. A clog resistant valve body comprising:
an inlet passage;
an outlet passage having a longitudinal axis and a stop positioned therein for ceasing forward progress of a pipe inserted into the outlet passage, the stop defining at least one recess;
a valve seat intermediate the inlet passage and outlet passage;
a bypass passage positioned generally transverse to the longitudinal axis of the outlet passage and terminating at one end proximate the at least one recess so that the at least one recess helps prevent adhesive from clogging the bypass passage;
wherein the stop defines a flat wall extending from an inner surface of the valve body and having a downstream face that faces a downstream opening of the outlet passage, the stop together with the inner surface defining the outlet passage and a recess forming a depression in the downstream face of the stop and extending upstream therefrom to surround the bypass passage on at least three sides.

2. The clog resistant valve body of claim 1 wherein the stop defines first and second side walls and a recessed upstream wall located between the first and second side walls to form the depression surrounding the bypass passage on three sides, the depression leaving an unobstructed downstream passage for fluid exiting the bypass passage to flow through unobstructed while positioning the side walls close enough to one another to prevent an adhesive applicator from coming into contact with the bypass passage.

3. The clog resistant valve body of claim 2 wherein the stop further defines at least one rib extending from the outlet passage positioned proximate the bypass passage to further assist in preventing the adhesive applicator from coming into contact with the bypass passage.

4. The clog resistant valve body of claim 3 wherein the at least one rib comprises a plurality of ribs extending about the outlet passage and having at least one rib positioned proximate the bypass passage to further assist in preventing the adhesive applicator from coming into contact with the bypass passage.

5. A clog resistant valve body comprising:
an inlet passage;
an outlet passage having a longitudinal axis and a stop positioned therein for ceasing forward progress of a pipe inserted into the outlet passage, the stop defining at least one of a recess and a rib;
a valve seat intermediate the inlet passage and outlet passage;
a bypass passage positioned generally transverse to the longitudinal axis of the outlet passage and terminating at one end proximate the at least one of a recess and a rib so that the at least one of a recess and a rib help prevent adhesive from clogging the bypass passage;
wherein the stop defines a flat wall extending from an inner surface of the valve body and having a downstream face that faces a downstream opening of the outlet passage, the stop together with the inner surface defining the outlet passage and the recess forming a depression in the outlet passage that surrounds the bypass passage on at least three sides;
wherein the stop defines first and second side walls and a recessed upstream wall located between the first and second side walls to form the depression surrounding the bypass passage on three sides, the depression leaving an unobstructed downstream passage for fluid exiting the bypass passage to flow through unobstructed while positioning the side walls close enough to one another to prevent an adhesive applicator from coming into contact with the bypass passage;
wherein the stop defines a plurality of ribs extending from the outlet passage about the outlet passage, the plurality of ribs comprises a first rib positioned proximate and on one side of the bypass passage and a second rib positioned proximate and on another side of the bypass passage opposite the first, with the first and second ribs being positioned close enough to one another to prevent the adhesive applicator from coming into contact with the bypass passage.

6. The clog resistant valve body of claim 5 wherein the first and second ribs form thin walls having upstream and downstream surfaces and elongated side walls, with at least the upstream surfaces being narrow to hinder particle build-up on the ribs and the downstream walls being tapered to help deflect the adhesive applicator away from the bypass passage.

7. The clog resistant valve body of claim 5 wherein the first and second ribs are spaced apart by a distance ranging between eighty-one thousandths of an inch to one hundred ninety-one thousandths of an inch (0.081"-0.191").

8. A clog resistant valve body comprising:
an inlet passage;
an outlet passage having a longitudinal axis and a stop positioned therein for ceasing forward progress of a pipe inserted into the outlet passage;
a valve seat intermediate the inlet passage and outlet passage;
a bypass passage positioned generally transverse to the longitudinal axis of the outlet passage and terminating at one end proximate the at least one of a recess and a rib so that the at least one of a recess and a rib help prevent adhesive from clogging the bypass passage;
wherein the stop defines a plurality of ribs extending from the outlet passage positioned proximate the bypass passage, the plurality of ribs comprises a first rib positioned proximate and on one side of the bypass passage and a second rib positioned proximate and on another side of the bypass passage opposite the first, with the first and second ribs being positioned close enough to one another to prevent the adhesive applicator from coming into contact with the bypass passage.

9. The clog resistant valve body of claim 8 wherein the first and second ribs form thin walls having upstream and downstream surfaces and elongated side walls, with at least the upstream surfaces being narrow to hinder particle build-up on the ribs and the downstream walls being tapered to help deflect the adhesive applicator away from the bypass passage.

10. The clog resistant valve body of claim 8 wherein the first and second ribs are spaced apart by a distance ranging between eighty-one thousandths of an inch to one hundred ninety-one thousandths of an inch (0.081"-0.191").

11. A method of hindering clogging of a bypass passage in a diaphragm valve comprising:
molding a valve body having an inlet passage, an outlet passage, a valve seat intermediate the inlet passage and the outlet passage, and a bypass passage terminating in a surface that defines the outlet passage; and
adding a plurality of ribs proximate the bypass passage to deflect the adhesive applicator away from the bypass passage and wick or draw adhesive away from the bypass passage to prevent partial or total clogging of the bypass passage.

12. A valve comprising:
a body defining an inlet and an outlet;
a valve operating in the body between an open position permitting flow from the inlet to the outlet and a closed position preventing flow between the inlet and the outlet;
a control chamber communicating with the valve to permit the valve to move between the open and closed positions;
a control passage communicating with the control chamber and the outlet, the control passage terminating at the outlet with a control hole; and
at least three walls, each with a surface facing the control hole to protect the control hole from being blocked and at least two walls being parallel to one another, the at least three walls defining a recess at the control hole and an unobstructed downstream opening to allow fluid escaping the control hole to continue traveling downstream in an unobstructed manner, with the three walls being positioned upstream of the downstream opening to assist in guiding the fluid escaping the control hole downstream and at least two of the walls assisting in blocking access to the control hole to prevent clogging of same.

13. A valve comprising:
a body defining an inlet and an outlet;
a valve operating in the body between an open position permitting flow from the inlet to the outlet and a closed position preventing flow between the inlet and the outlet;
a control chamber communicating with the valve to permit the valve to move between the open and closed positions;
a control passage communicating with the control chamber and the outlet, the control passage terminating at the outlet with a control hole; and
at least two walls, each with a surface facing the control hole to protect the control hole from being blocked, wherein the at least two walls include ribs extending adjacent the control hole and beyond adjacent surfaces to form obstructions assisting in blocking access to the control hole to prevent clogging of same.

* * * * *